(12) United States Patent
Oba et al.

(10) Patent No.: US 11,499,449 B2
(45) Date of Patent: Nov. 15, 2022

(54) GAS TURBINE MODULE, GAS TURBINE PLANT INCLUDING THE SAME, METHOD OF UNLOADING GAS TURBINE MODULE, AND METHOD OF EXCHANGING GAS TURBINE MODULE

(71) Applicant: Mitsubishi Power, Ltd., Yokohama (JP)

(72) Inventors: Yosuke Oba, Yokohama (JP); Shingo Nakashima, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 45 days.

(21) Appl. No.: 17/105,862

(22) Filed: Nov. 27, 2020

(65) Prior Publication Data

US 2021/0172342 A1   Jun. 10, 2021

(30) Foreign Application Priority Data

Dec. 4, 2019   (JP) .............................. JP2019-219761

(51) Int. Cl.
*F01D 25/28* (2006.01)
*F02C 7/20* (2006.01)

(52) U.S. Cl.
CPC ................ *F01D 25/28* (2013.01); *F02C 7/20* (2013.01); *F05D 2230/51* (2013.01); *F05D 2230/64* (2013.01)

(58) Field of Classification Search
CPC ........ F01D 25/28; F02C 7/20; F05D 2230/51; F05D 2230/64; B66F 19/00
See application file for complete search history.

(56) References Cited

U.S. PATENT DOCUMENTS

| | | | | |
|---|---|---|---|---|
| 2,929,218 | A | * | 3/1960 | Yates ...................... F01D 25/28 415/176 |
| 4,044,442 | A | * | 8/1977 | Carlson ................. F01D 25/285 29/888.012 |
| 5,383,652 | A | * | 1/1995 | Van Den Berg ........ B66C 1/107 269/51 |
| 10,895,202 | B1 | * | 1/2021 | Yeung ....................... F02C 7/32 |

(Continued)

FOREIGN PATENT DOCUMENTS

| | | | |
|---|---|---|---|
| EP | 2 196 431 | 6/2010 | |
| GB | 2526626 A | * 12/2015 | ........... F01D 25/285 |

(Continued)

OTHER PUBLICATIONS

1MW and 2.5 MW Distributed Turbine Power Generation—MTT Solutions [Viewed on internet on Sep. 6, 2022] Viewed on internet. <URL:https://www.marineturbine.com/1mw-and-2-5mw-distributed-tmbine-power-generation-mtt-solutions/ >, Published on Oct. 20, 2015.

*Primary Examiner* — Craig Kim
(74) *Attorney, Agent, or Firm* — Wenderoth, Lind & Ponack, L.L.P.

(57) ABSTRACT

A gas turbine module includes a gas turbine that has a gas turbine rotor and a turbine shell; an inlet plenum that is connected to an inlet of the gas turbine; an exhaust plenum that is connected to an exhaust of the gas turbine; an enclosure that covers the gas turbine; and a common base on which the gas turbine, the inlet plenum, the exhaust plenum, and the enclosure are mounted. When moving the gas turbine, the gas turbine module is moved together.

14 Claims, 14 Drawing Sheets

(56) References Cited

U.S. PATENT DOCUMENTS

| | | | | |
|---|---|---|---|---|
| 10,961,908 | B1 * | 3/2021 | Yeung | F01D 15/10 |
| 11,098,651 | B1 * | 8/2021 | Yeung | F02C 6/00 |
| 11,109,508 | B1 * | 8/2021 | Yeung | H05K 7/20209 |
| 11,208,953 | B1 * | 12/2021 | Yeung | F01D 15/08 |
| 11,255,217 | B2 * | 2/2022 | Landry | F01D 17/162 |
| 2007/0131839 | A1 * | 6/2007 | Dunn | B63H 21/16 |
| | | | | 267/140.12 |
| 2008/0187431 | A1 * | 8/2008 | Brown | F01D 25/28 |
| | | | | 415/1 |
| 2010/0150693 | A1 * | 6/2010 | Frassinelli | F01D 25/28 |
| | | | | 414/800 |
| 2015/0184591 | A1 | 7/2015 | Giancotti et al. | |
| 2016/0161048 | A1 | 6/2016 | Davi et al. | |
| 2016/0305270 | A1 * | 10/2016 | Marcucci | F01D 25/28 |
| 2019/0003340 | A1 * | 1/2019 | Le Gall | F01D 25/285 |
| 2019/0063262 | A1 * | 2/2019 | Davis | F01D 25/28 |
| 2019/0063309 | A1 * | 2/2019 | Davis | F01D 25/28 |
| 2019/0154261 | A1 | 5/2019 | Yerram et al. | |
| 2021/0079849 | A1 * | 3/2021 | Yeung | F02C 7/24 |
| 2021/0172342 | A1 * | 6/2021 | Oba | F01D 25/28 |
| 2022/0065118 | A1 * | 3/2022 | Kray | F01D 5/32 |
| 2022/0065125 | A1 * | 3/2022 | Spencer | F01D 25/30 |

FOREIGN PATENT DOCUMENTS

| | | | | |
|---|---|---|---|---|
| JP | 2012149523 A | * | 8/2012 | |
| WO | 2016/032998 | | 3/2016 | |
| WO | WO-2019045687 A1 | * | 3/2019 | E21B 43/26 |
| WO | WO-2019045688 A1 | * | 3/2019 | F02B 63/047 |

\* cited by examiner

GAS TURBINE MODULE, GAS TURBINE PLANT INCLUDING THE SAME, METHOD OF UNLOADING GAS TURBINE MODULE, AND METHOD OF EXCHANGING GAS TURBINE MODULE

BACKGROUND OF THE INVENTION

Field of the Invention

The present disclosure relates to a gas turbine module including a gas turbine, a gas turbine plant including the same, a method of unloading a gas turbine module, and a method of exchanging a gas turbine module.

Priority is claimed on Japanese Patent Application No. 2019-219761, filed Dec. 4, 2019, the content of which is incorporated herein by reference.

Description of Related Art

When inspecting a gas turbine, it is necessary to isolate a plurality of components constituting the gas turbine and then inspect each component. Therefore, the inspection period of the gas turbine becomes long. However, an operator has a desire to make the operation period of the gas turbine as long as possible.

Patent Document 1 below proposes a method of exchanging a gas turbine in operation with another gas turbine of the same type. Patent Document 1 discloses a method of separating a compressor and a turbine that constitute the gas turbine and then individually unloading the compressor and the turbine.

PATENT DOCUMENTS

[Patent Document 1] United States Patent Application, Publication No. 2008/0187431

SUMMARY OF THE INVENTION

In the technique described in Patent Document 1, by exchanging the gas turbine in operation with the gas turbine of the same type, it is possible to prevent the gas turbine from being stopped for a long period due to inspection and repair of the gas turbine. However, the operator has a desire to facilitate the exchange work of the gas turbine and to shorten a work period.

An object of the present disclosure is to provide a technique capable of facilitating the exchanging work of the gas turbine and shortening the work period.

A method of unloading a gas turbine module according to an aspect of the present disclosure for achieving the above-described object involves moving the following gas turbine module.

The gas turbine module includes a gas turbine that has a gas turbine rotor capable of rotating about an axis, and a turbine shell which covers the gas turbine rotor and in which an inlet and an exhaust are formed; an inlet plenum that is connected to the inlet of the gas turbine and is configured to guide air from an inlet duct into the gas turbine; an exhaust plenum that is connected to the exhaust of the gas turbine and is configured to guide exhaust gas from the gas turbine to an exhaust duct; an enclosure that covers the gas turbine; and a common base on which the gas turbine, the inlet plenum, the exhaust plenum, and the enclosure are mounted and which is connected to a gas turbine foundation.

A method of moving a gas turbine module according to the aspect includes executing the steps including a connection release step of releasing a connection between the common base and the gas turbine foundation, and releasing connections between the gas turbine module and a plurality of connection objects that are connected to the gas turbine module and constitute a part of a gas turbine plant; a module raising step of lifting the gas turbine module from the gas turbine foundation after the connection release step; a moving equipment disposition step of disposing moving equipment that is configured to move the gas turbine module in a gap between the common base and the gas turbine foundation during the module raising step; a module lowering step of ending the module raising step after the moving equipment disposition step and placing the gas turbine module on the moving equipment; and an unloading step of driving the moving equipment after the module lowering step and moving the gas turbine module.

In a method of exchanging a gas turbine module according to an aspect of the present disclosure for achieving the above-described object, the method of unloading a gas turbine module according to the above-described aspect is executed and a loading method of loading a no. 2 gas turbine module different from a no. 1 gas turbine module which is the gas turbine module is executed.

The no. 2 gas turbine module includes a no. 2 gas turbine that has a no. 2 gas turbine rotor capable of rotating about an axis, and a no. 2 turbine shell which covers the no. 2 gas turbine rotor and in which a no. 2 inlet and a no. 2 exhaust are formed; a no. 2 inlet plenum that is connected to the no. 2 inlet of the no. 2 gas turbine and is configured to guide air from the inlet duct into the no. 2 gas turbine; a no. 2 exhaust plenum that is connected to the no. 2 exhaust of the no. 2 gas turbine and is configured to guide exhaust gas from the no. 2 gas turbine to the exhaust duct; a no. 2 enclosure that covers the no. 2 gas turbine; and a no. 2 common base on which the no. 2 gas turbine, the no. 2 inlet plenum, the no. 2 exhaust plenum, and the no. 2 enclosure are mounted and which is connected to the gas turbine foundation. The no. 2 gas turbine module is capable of being connected to the plurality of connection objects that were connected to the no. 1 gas turbine module.

The loading method includes executing the steps including a no. 2 moving equipment disposition step of disposing the moving equipment on the gas turbine foundation; a loading step of driving the moving equipment after the no. 2 gas turbine module is placed on the moving equipment and moving the no. 2 gas turbine module to a location on the gas turbine foundation where the no. 1 gas turbine module was present; a no. 2 module raising step of lifting the no. 2 gas turbine module from the moving equipment after the loading step; a moving equipment removing step of removing the moving equipment from above the gas turbine foundation during the no. 2 module raising step; a no. 2 module lowering step of ending the no. 2 module raising step after the moving equipment removing step and placing the no. 2 gas turbine module on the gas turbine foundation; and a connection step of connecting the no. 2 common base and the gas turbine foundation to each other and connecting the no. 2 gas turbine module and the plurality of connection objects to each other.

A gas turbine module according to an aspect of the present disclosure for achieving the above-described object includes a gas turbine that has a gas turbine rotor capable of rotating about an axis, and a turbine shell which covers the gas turbine rotor and in which an inlet and an exhaust are formed; an inlet plenum that is connected to the inlet of the gas turbine and is configured to guide air from an inlet duct into the gas turbine; an exhaust plenum that is connected to the exhaust of the gas turbine and is configured to guide exhaust gas from the gas turbine to an exhaust duct; an enclosure that covers the gas turbine; a gas turbine base on which the gas turbine and the inlet plenum are mounted; and a common base on which the gas turbine base, the enclosure, and the exhaust plenum are mounted.

A gas turbine plant according to an aspect of the present disclosure for achieving the above-described object includes the gas turbine module according to the above-described aspect; inlet rotating equipment that has a rotor and is disposed more on a no. 1 axial side where the inlet is present with respect to the exhaust in an axial direction in which the axis extends than the gas turbine module; and an inlet coupling that is configured to connect the rotor of the inlet rotating equipment and an end of the gas turbine rotor on the no. 1 axial side to each other. An inlet flange is formed at an end of the gas turbine rotor on the no. axial 1 side. The inlet coupling has a no. 1 flange capable of being connected to the inlet flange and a no. 2 flange capable of being connected to the rotor of the inlet rotating equipment. In a state in which the no. 1 flange of the inlet coupling is connected to the inlet flange, the no. 2 flange of the inlet coupling is located more on the no. 1 axial side than the inlet plenum.

A gas turbine plant according to another aspect of the present disclosure for achieving the above-described object includes the gas turbine module according to the above-described aspect; exhaust rotating equipment that has a rotor and is disposed more on a no. 2 axial side where the exhaust is present with respect to the inlet in an axial direction in which the axis extends than the gas turbine module; and an exhaust coupling that is configured to connect the rotor of the exhaust rotating equipment and an end of the gas turbine rotor on the no. 2 axial side to each other. An exhaust flange is formed at an end of the gas turbine rotor on the no. 2 axial side. The exhaust coupling has a no. 1 flange capable of being connected to the exhaust flange and a no. 2 flange capable of being connected to the rotor of the exhaust rotating equipment. In a state in which the no. 1 flange of the exhaust coupling is connected to the exhaust flange, the no. 2 flange of the exhaust coupling is located more on the no. 2 axial side than the exhaust plenum.

According to the gas turbine module, the method of moving a gas turbine module, and the method of exchanging a gas turbine module of the present disclosure, the exchanging work of the gas turbine can be easily performed, and the work period can be shortened.

DETAILED DESCRIPTION OF THE INVENTION

Hereinafter, a gas turbine module, a method of moving a gas turbine module, and a method of exchanging a gas turbine module according to an embodiment of the present disclosure will be described in detail with reference to the drawings.

[Gas Turbine and Gas Turbine Plant Including the Same]

A gas turbine and a gas turbine plant including the same of the present embodiment will be described with reference to FIGS. 1 and 2.

Figure 1:
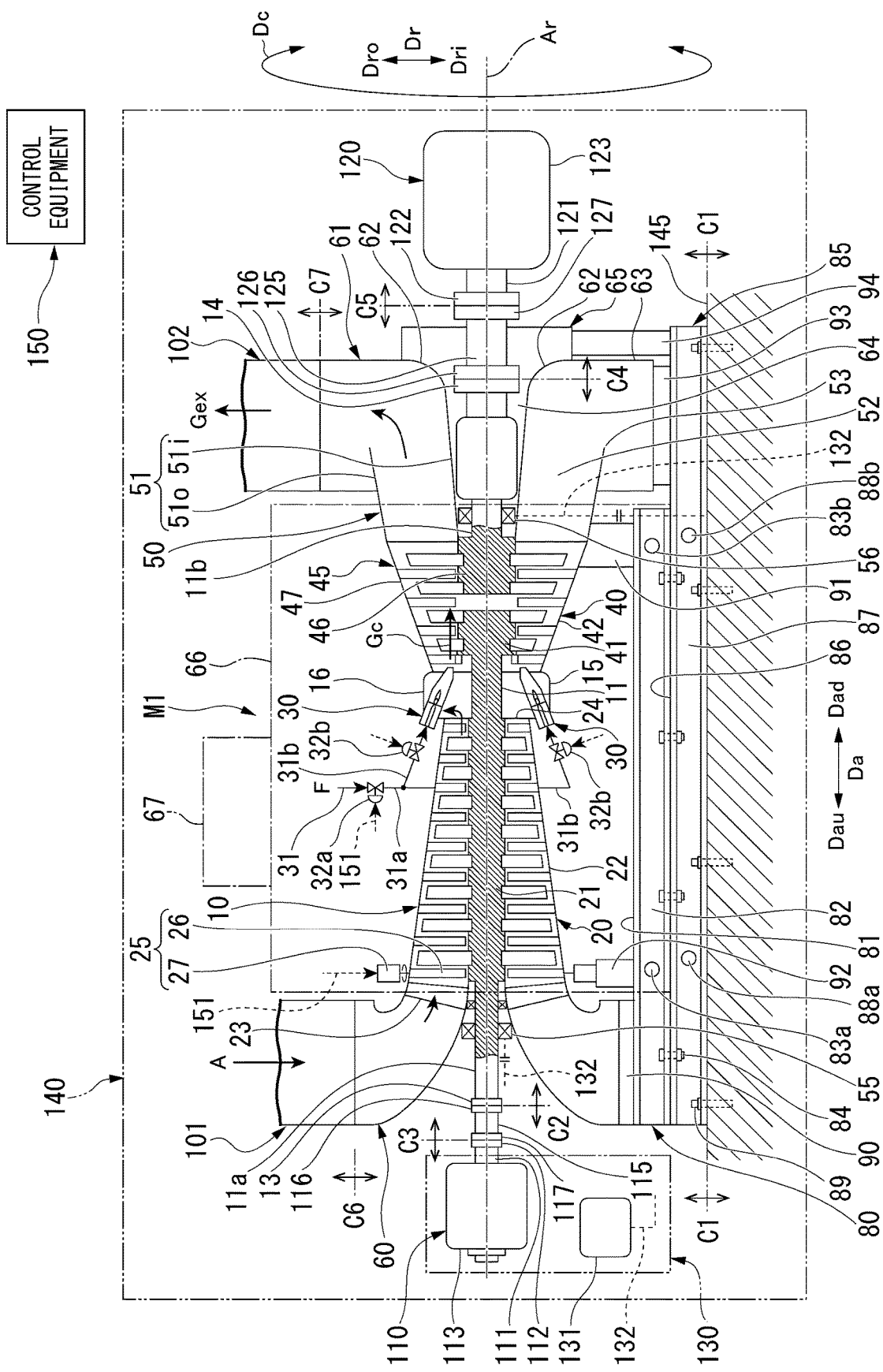
FIG. 1 is an explanatory view showing a schematic configuration of a gas turbine plant according to an embodiment of the present disclosure.
Figure 2A:
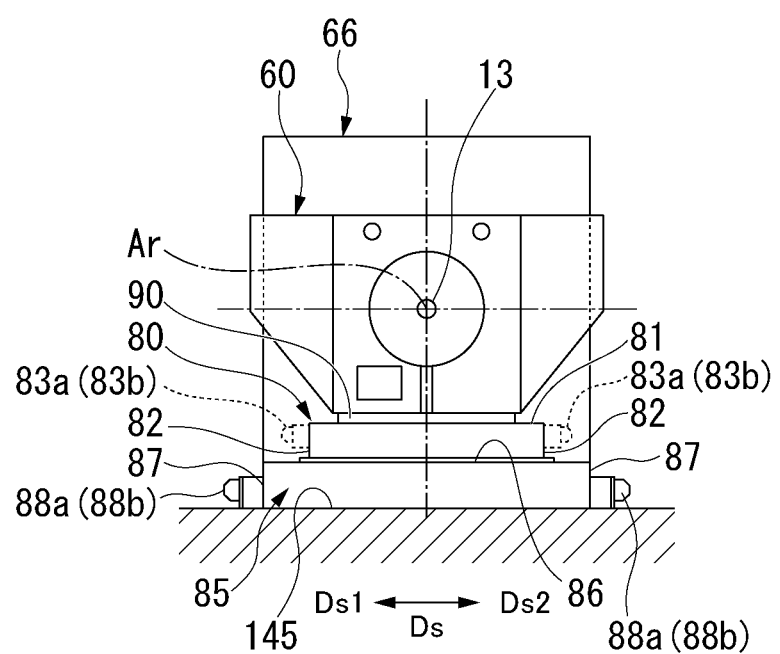
FIG. 2A is a front view of a gas turbine module according to the embodiment of the present disclosure.
Figure 2B:
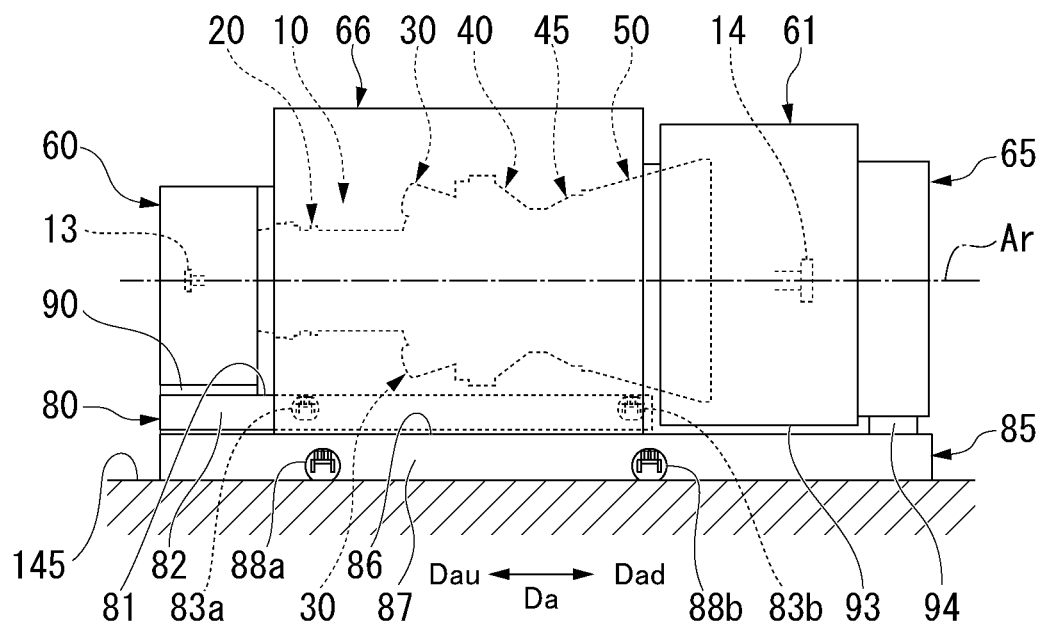
FIG. 2B is a right side view of the gas turbine module according to the embodiment of the present disclosure.

As shown in FIG. 1, the gas turbine plant of the present embodiment includes a no. 1 gas turbine module M1, an inlet duct 101, an exhaust duct 102, inlet rotating equipment 110, exhaust rotating equipment 120, lube oil supply equipment 131, an ACC enclosure 130, a plant building 140 that covers these, and control equipment 150 that controls the operations of these. Although the control equipment 150 may be disposed in the plant building 140, the control equipment is basically disposed in a control enclosure outside the plant building 140.

The no. 1 gas turbine module M1 includes a gas turbine 10, an inlet plenum 60, an exhaust plenum 61, a load compartment 65, an enclosure 66, a ventilation system 67, a gas turbine base 80, and a common base 85.

The gas turbine 10 of the present embodiment is a two-shaft gas turbine. The gas turbine 10 includes a compressor 20 that compresses air A to generate compressed air, a plurality of combustors 30 that combust fuel F in the compressed air to generate combustion gas Gc, a high pressure turbine 40 that is driven by the combustion gas Gc from the plurality of combustors 30, a low pressure turbine 45 that is driven by the combustion gas Gc exhausted from the high pressure turbine 40, a discharge casing 16, an exhaust casing 50, an inlet bearing 55, and an exhaust bearing 56.

The compressor 20 includes a compressor rotor 21 that rotates about an axis Ar, a compressor casing 22 that covers an outer peripheral side of the compressor rotor 21, and inlet guide vane equipment (IGV equipment) 25 that controls a flow rate of air that is sucked into the compressor casing 22. In the following, a direction in which the axis Ar extends is referred to as an axial direction Da, a circumferential direction about the axis Ar is simply referred to as a circumferential direction Dc, and a direction perpendicular to the axis Ar is referred to as a radial direction Dr. Further, one side in the axial direction Da is referred to as an axial upstream side (or a no. 1 axis Ar side) Dau, and a side opposite to the axial upstream side is referred to as an axial downstream side (or a no. 2 axis Ar side) Dad. Further, a side closer to the axis Ar in the radial direction Dr is referred to as a radial direction inner side Dri, and a side opposite to the radial direction inner side is referred to as a radial direction outer side Dro.

The compressor casing 22 has an inlet 23 for sucking the air and a discharge 24 for discharging the compressed air. The inlet 23 is formed at an end of the compressor casing 22 on the axial upstream side Dau, and the discharge 24 is formed at an end of the compressor casing 22 on the axial downstream side Dad. The IGV equipment 25 includes a vane 26 disposed on the inlet 23 side in the compressor casing 22, and a driver 27 that drives the vane 26.

The high pressure turbine 40 is disposed on the axial downstream side Dad of the compressor 20. The high pressure turbine 40 includes a high pressure turbine rotor 41 that rotates about the axis Ar, and a high pressure turbine casing 42 that covers an outer peripheral side of the high pressure turbine rotor 41.

The low pressure turbine 45 is disposed on the axial downstream side Dad of the high pressure turbine 40. The low pressure turbine 45 includes a low pressure turbine rotor 46 that rotates about the axis Ar, and a low pressure turbine casing 47 that covers an outer peripheral side of the low pressure turbine rotor 46. The low pressure turbine casing 47 is connected to an end of the high pressure turbine casing 42 on the axial downstream side Dad.

The exhaust casing 50 is connected to an end of the low pressure turbine casing 47 on the axial downstream side Dad. The exhaust casing 50 includes an exhaust diffuser 51. The exhaust diffuser 51 includes a cylindrical outer diffuser 51o centered on the axis Ar and an inner diffuser 51i which is cylindrical about the axis Ar and is disposed on the radial direction inner side Dri of the outer diffuser 51o. A diffuser area 52 through which exhaust gas Gex exhausted from the low pressure turbine 45 passes is formed between an inner peripheral side of the outer diffuser 51o and an outer peripheral side of the inner diffuser 51i. A portion defined by an edge of the outer diffuser 51o on the axial downstream side Dad and an edge of the inner diffuser 51i on the axial downstream side Dad forms an exhaust 53.

The discharge casing 16 is disposed between the compressor casing 22 and the high pressure turbine casing 42 in the axial direction Da, and connects the compressor casing 22 and the high pressure turbine casing 42 to each other. The compressed air discharged from the discharge 24 of the compressor 20 flows into the discharge casing 16.

The plurality of combustors 30 are provided in the discharge casing 16. The plurality of combustors 30 are connected to a fuel supply source through fuel piping 31. The fuel piping 31 includes main fuel piping 31a connected to the fuel supply source and a plurality of pieces of fuel piping for combustors 31b branched from the main fuel piping 31a. The fuel piping for combustors 31b is provided for each of the plurality of combustors 30, and each is connected to the corresponding one combustor 30. The main fuel piping 31a is provided with a main fuel control valve 32a. The plurality of pieces of fuel piping for combustors 31b are each provided with a fuel control valve for a combustor 32b. The fuel F from the fuel piping 31 is supplied to the combustor 30, and the compressed air in the discharge casing 16 flows into the combustor. The combustor 30 combusts the fuel F in the compressed air to generate the combustion gas Gc. The combustion gas Gc flows into the high pressure turbine casing 42 and drives the high pressure turbine 40.

The compressor rotor 21 and the high pressure turbine rotor 41 are located on the same axis Ar and are connected to each other to form a no. 1 rotor 11a. The low pressure turbine rotor 46 constitutes a no. 2 rotor 11b. The no. 2 rotor 11b is not mechanically connected to the no. 1 rotor 11a. Therefore, the no. 2 rotor 11b can rotate independently of the rotation of the no. 1 rotor 11a. In other words, the low pressure turbine rotor 46 can rotate independently of the rotation of the high pressure turbine rotor 41. A gas turbine rotor 11 includes the no. 1 rotor 11a and the no. 2 rotor 11b. An inlet flange 13 is formed at an end of the gas turbine rotor 11 on the axial upstream side Dau, in other words, at an end of the no. 1 rotor 11a on the axial upstream side Dau. Further, an exhaust flange 14 is formed at an end of the gas turbine rotor 11 on the axial downstream side Dad, in other words, at an end of the no. 2 rotor 11b on the axial downstream side Dad. Note that both of the inlet flange 13 and the exhaust flange 14 are connection flanges.

The inlet bearing 55 supports a portion of the gas turbine rotor 11 on the axial upstream side Dau to be capable of rotatably supporting the gas turbine rotor 11. Further, the exhaust bearing 56 supports a portion of the gas turbine rotor 11 on the axial downstream side Dad to be capable of rotatably supporting the gas turbine rotor 11.

A turbine shell 15 is configured to include the compressor casing 22, the discharge casing 16, the high pressure turbine casing 42, the low pressure turbine casing 47, and the exhaust casing 50. The inlet 23 of the compressor casing 22 constitutes an inlet of the turbine shell 15. Further, the exhaust 53 of the exhaust casing 50 constitutes an exhaust of the turbine shell 15.

The inlet plenum 60 is connected to the inlet duct 101 and is connected to the inlet 23 of the turbine shell 15. The air A that is sucked by the compressor 20 flows into the inlet duct 101. In the inlet duct 101, an upstream side portion related to the flow of the air A is provided with an inlet filter, for example. In the inlet duct 101, and in a downstream side portion related to the flow of the air A, the air A flows in the radial direction Dr with respect to the axis Ar. The inlet plenum 60 smoothly guides the air from the inlet duct 101 into the compressor casing 22. Specifically, the inlet plenum 60 gradually converts the flow of the air A from the inlet duct 101 in the radial direction Dr into a flow in the axial direction Da. Further, the inlet plenum 60 distributes the air A from the inlet duct 101 substantially evenly in the circumferential direction Dc in the compressor casing 22. The inlet flange 13 and the inlet bearing 55 are located on the radial direction inner side Dri of the inlet plenum 60.

The exhaust plenum 61 is connected to the exhaust duct 102 and is connected to the exhaust 53 of the turbine shell 15. The exhaust gas Gex exhausted from the exhaust casing 50 flows through the exhaust plenum 61 and the exhaust duct 102. In the exhaust duct 102, and in an upstream side portion related to the flow of the exhaust gas Gex, the exhaust gas Gex flows in the radial direction Dr with respect to the axis Ar. The exhaust plenum 61 guides the exhaust gas Gex exhausted from the exhaust casing 50 to the exhaust duct 102. The exhaust plenum 61 gradually converts the flow of the exhaust gas Gex exhausted from the exhaust casing 50 into a flow in the radial direction Dr. The exhaust plenum 61 includes an exhaust gas guide 62 and an exhaust plenum casing 63. The exhaust gas guide 62 is connected to the edge of the inner diffuser 51i on the axial downstream side Dad, in other words, is connected to a part of the exhaust 53 of the turbine shell 15, and causes a direction of the flow of the exhaust gas Gex that has passed through the diffuser area 52 to gradually face the radial direction outer side Dro. The exhaust plenum casing 63 covers portions of the inner diffuser 51i and the outer diffuser 51o on the axial downstream side Dad, and the exhaust gas guide 62. The exhaust plenum casing 63 is connected to the exhaust duct 102.

The load compartment 65 is located more on the axial downstream side Dad than the exhaust plenum 61 and is connected to the exhaust plenum 61. The load compartment 65 partitions an area defined by the inner diffuser 51i of the exhaust casing 50 and the exhaust gas guide 62 of the exhaust plenum 61 on the radial direction inner side Dri from the outside. This area forms an exhaust bearing area 64. The exhaust flange 14 and the exhaust bearing 56 are located in the exhaust bearing area 64. It can be said that the exhaust flange 14 and the exhaust bearing 56 are disposed on the radial direction inner side Dri of the exhaust plenum 61.

Cooling air from the outside is supplied into the exhaust bearing area 64. The exhaust bearing 56 in the exhaust bearing area 64 is cooled by the cooling air.

The enclosure 66 covers the gas turbine 10 as shown in FIGS. 1 and 2A to 2C. On the other hand, the enclosure 66 does not cover the inlet plenum 60 and the exhaust plenum 61.

Therefore, the enclosure 66 does not cover the inlet 23 of the gas turbine 10 which is connected to the inlet plenum 60 and the exhaust 53 of the gas turbine 10 which is connected to the exhaust plenum 61. Further, the enclosure 66 does not cover the inlet flange 13 and the inlet bearing 55 disposed on the radial direction inner side Dri of the inlet plenum 60. Further, the enclosure 66 does not cover the exhaust flange 14 and the exhaust bearing 56 disposed on the radial direction inner side Dri of the exhaust plenum 61.

The ventilation system 67 is provided above the enclosure 66. The ventilation system 67 ventilates the air inside the enclosure 66 and prevents the temperature inside the enclosure 66 from becoming high.

Figure 2C:
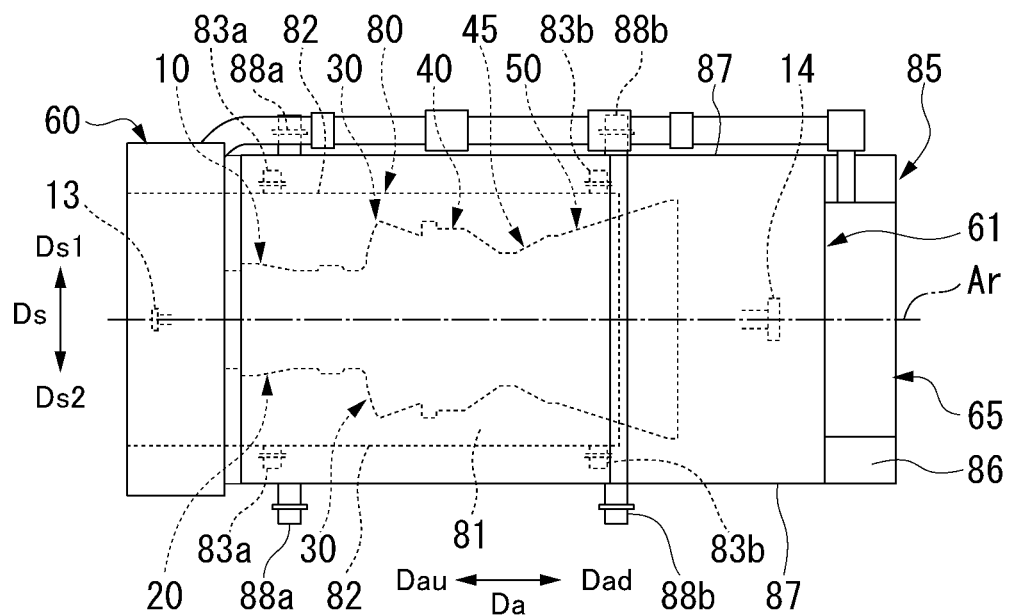
FIG. 2C is a plan view of the gas turbine module according to the embodiment of the present disclosure.

The inlet plenum 60 and the gas turbine 10 are mounted on the gas turbine base 80. The gas turbine base 80 includes an upper surface 81 on which the inlet plenum 60 and the gas turbine 10 are mounted, and a pair of side surfaces 82. The upper surface 81 of the gas turbine base 80 extends in a horizontal direction. As shown in FIG. 2C, the upper surface 81 is a rectangle whose longitudinal direction is the axial direction Da. One side surface 82 of the pair of side surfaces 82 is connected to one long side of a pair of long sides of the rectangular upper surface 81. Further, the other side surface 82 is connected to the other long side of the pair of long sides of the rectangular upper surface 81. Therefore, both of the pair of side surfaces 82 extend in the axial direction Da and are parallel to each other.

Here, a direction that is a horizontal direction and is perpendicular to the axis Ar is referred to as a side direction Ds. In the side direction Ds, one side is referred to as a no. 1 side direction side Ds1 and the other side is referred to as a no. 2 side direction side Ds2. The position of the gas turbine 10 in the side direction Ds of the axis Ar is the center between the position of the one side surface 82 and the position of the other side surface 82 in the side direction Ds.

The one side surface 82 and the other side surface 82 of the gas turbine base 80 are each provided with a no. 1 trunnion 83a and a no. 2 trunnion 83b. The no. 2 trunnion 83b is disposed more on the axial downstream side Dad than the no. 1 trunnion 83a. The no. 1 trunnion 83a and the no. 2 trunnion 83b protrude from the side surface 82 of the gas turbine base 80 in the side direction Ds. The no. 1 trunnion 83a provided on the one side surface 82 and the no. 1 trunnion 83a provided on the other side surface 82 have the same position in the axial direction Da. Further, the no. 2 trunnion 83b provided on the one side surface 82 and the no. 2 trunnion 83b provided on the other side surface 82 have the same position in the axial direction Da. Each of the trunnions 83a and 83b serves to receive a load that is generated when the gas turbine base 80 is lifted.

As shown in FIGS. 1 and 2A to 2C, the gas turbine base 80, the enclosure 66, the exhaust plenum 61, and the load compartment 65 are mounted on the common base 85. The common base 85 includes an upper surface 86 on which the gas turbine base 80, the enclosure 66, the exhaust plenum 61, and the load compartment 65 are mounted, and a pair of side surfaces 87. The upper surface 86 of the common base 85 extends in the horizontal direction. As shown in FIG. 2C, the upper surface 86 is a rectangle whose longitudinal direction is the axial direction Da. One side surface 87 of the pair of side surfaces 87 is connected to one long side of a pair of long sides of the rectangular upper surface 86. Further, the other side surface 87 is connected to the other long side of the pair of long sides of the rectangular upper surface 86. Therefore, both of the pair of side surfaces 87 extend in the axial direction Da and are parallel to each other. The position of the gas turbine 10 in the side direction Ds of the axis Ar is a center between the position of the one side surface 87 and the position of the other side surface 87 in the side direction Ds. Note that the side direction Ds is also a direction along the upper surface 81 of the gas turbine base 80 or the upper surface 86 of the common base 85 and perpendicular to the axis Ar.

The one side surface 87 and the other side surface 87 of the common base 85 are each provided with a no. 1 trunnion 88a and a no. 2 trunnion 88b. The no. 2 trunnion 88b is disposed more on the axial downstream side Dad than the no. 1 trunnion 88a. The no. 1 trunnion 88a and the no. 2 trunnion 88b protrude from the side surface 87 of the common base 85 in the side direction Ds. The no. 1 trunnion 88a provided on the one side surface 87 and the no. 1 trunnion 88a provided on the other side surface 87 have the same position in the axial direction Da. Further, the no. 2 trunnion 88b provided on the one side surface 87 and the no. 2 trunnion 88b provided on the other side surface 87 have the same position in the axial direction Da. Each of the trunnions 88a and 88b serves to receive a load that is generated when the common base 85 is lifted.

The no. 1 trunnion 83a of the gas turbine base 80 is disposed at a position overlapping the no. 1 trunnion 88a of the common base 85 in the axial direction Da. Further, the no. 2 trunnion 83b of the gas turbine base 80 is disposed at a position overlapping the no. 2 trunnion 88b of the common base 85 in the axial direction Da.

The above-described gas turbine base 80 is connected to the common base 85 by a plurality of connection parts (for example, bolts and nuts) 84, as shown in FIG. 1. The common base 85 is disposed on a gas turbine foundation 145. The common base 85 is fixed to the gas turbine foundation 145 by a plurality of anchor bolts 89. The anchor bolts 89 are not welded to the common base 85 so that they can be easily removed from the common base 85.

The above-described enclosure 66 covers the gas turbine 10 and all of the portions of the gas turbine base 80 except the portion on which the inlet plenum 60 is mounted.

As shown in FIG. 1, the no. 1 gas turbine module M1 further includes an inlet support 90, an exhaust support 91, an IGV support 92, an exhaust plenum support 93, and a load compartment support 94. Both of the inlet support 90 and the exhaust support 91 support the gas turbine 10. The inlet support 90 is fixed to the upper surface 81 of the gas turbine base 80 and supports the inlet plenum 60. The inlet support 90 supports the inlet plenum 60, thereby supporting the gas turbine 10 connected to the inlet plenum 60. The exhaust support 91 is fixed to the upper surface 81 of the gas turbine base 80 and supports a portion of the gas turbine 10 on the axial downstream side Dad. The IGV support 92 is fixed to the upper surface 81 of the gas turbine base 80 and supports the IGV equipment 25. The exhaust plenum support 93 is fixed to the upper surface 86 of the common base 85 and supports the exhaust plenum 61. The load compartment support 94 is fixed to the upper surface 86 of the common base 85 and supports the load compartment 65.

The inlet rotating equipment 110 is, for example, a starter motor for starting rotation of the gas turbine rotor 11 that is stopped. The inlet rotating equipment 110 is disposed on the axial upstream side Dau of the no. 1 gas turbine module M1. The inlet rotating equipment 110 includes a rotor 111 that rotates about the axis Ar and a casing 113 that covers the rotor 111. An end of the rotor 111 on the axial downstream side Dad protrudes from the casing 113 to the axial downstream side Dad. A flange 112 is formed at the end of the rotor 111 on the axial downstream side Dad. An inlet coupling 115 is disposed between the flange 112 of the inlet rotating equipment 110 and the inlet flange 13 of the gas turbine rotor 11. The inlet coupling 115 includes a no. 1 flange 116 capable of being connected to the inlet flange 13 of the gas turbine rotor 11 and a no. 2 flange 117 capable of being connected to the flange 112 of the inlet rotating equipment 110. The rotor 111 of the inlet rotating equipment 110 and the gas turbine rotor 11 are connected to each other via the inlet coupling 115. Therefore, the inlet flange 13 of the gas turbine rotor 11 can be connected to the rotor 111 of the inlet rotating equipment 110 via the inlet coupling 115. The no. 2 flange 117 of the inlet coupling 115 is located more on the axial upstream side Dau than the inlet plenum 60. Note that all of the flange 112, the no. 1 flange 116, and the no. 2 flange 117 are connection flanges.

The lube oil supply equipment 131 supplies lube oil to the inlet bearing 55 and the exhaust bearing 56 via the lube oil piping 132.

The ACC enclosure 130 covers various ACCs including the inlet rotating equipment 110 and the lube oil supply equipment 131.

The exhaust rotating equipment 120 is, for example, rotating equipment that is driven by the gas turbine 10. Specifically, the exhaust rotating equipment 120 is, for example, a generator, a rotary compressor, a rotary pump, or the like. The exhaust rotating equipment 120 is disposed on the axial downstream side Dad of the no. 1 gas turbine module M1. The exhaust rotating equipment 120 includes a rotor 121 that rotates about the axis Ar and a casing 123 that covers the rotor 121. An end of the rotor 121 on the axial upstream side Dau protrudes from the casing 123 to the axial upstream side Dau. A flange 122 is formed at the end of the rotor 121 on the axial upstream side Dau. An exhaust coupling 125 is disposed between the flange 122 of the exhaust rotating equipment 120 and the exhaust flange 14 of the gas turbine rotor 11. The exhaust coupling 125 includes a no. 1 flange 126 capable of being connected to the exhaust flange 14 of the gas turbine rotor 11 and a no. 2 flange 127 capable of being connected to the flange 122 of the exhaust rotating equipment 120. The rotor 121 of the exhaust rotating equipment 120 and the gas turbine rotor 11 are connected to each other via the exhaust coupling 125. Therefore, the exhaust flange 14 of the gas turbine rotor 11 can be connected to the rotor 121 of the exhaust rotating equipment 120 via the exhaust coupling 125. The no. 2 flange 127 of the exhaust coupling 125 is located more on the axial downstream side Dad than the exhaust plenum 61 and the load compartment 65. Note that all of the flange 122, the no. 1 flange 126, and the no. 2 flange 127 are connection flanges.

The control equipment 150 is connected to the IGV equipment 25, the main fuel control valve 32a, the plurality of fuel control valves for combustors 32b, the lube oil supply equipment 131, and the like by various cables 151.

Figure 3:
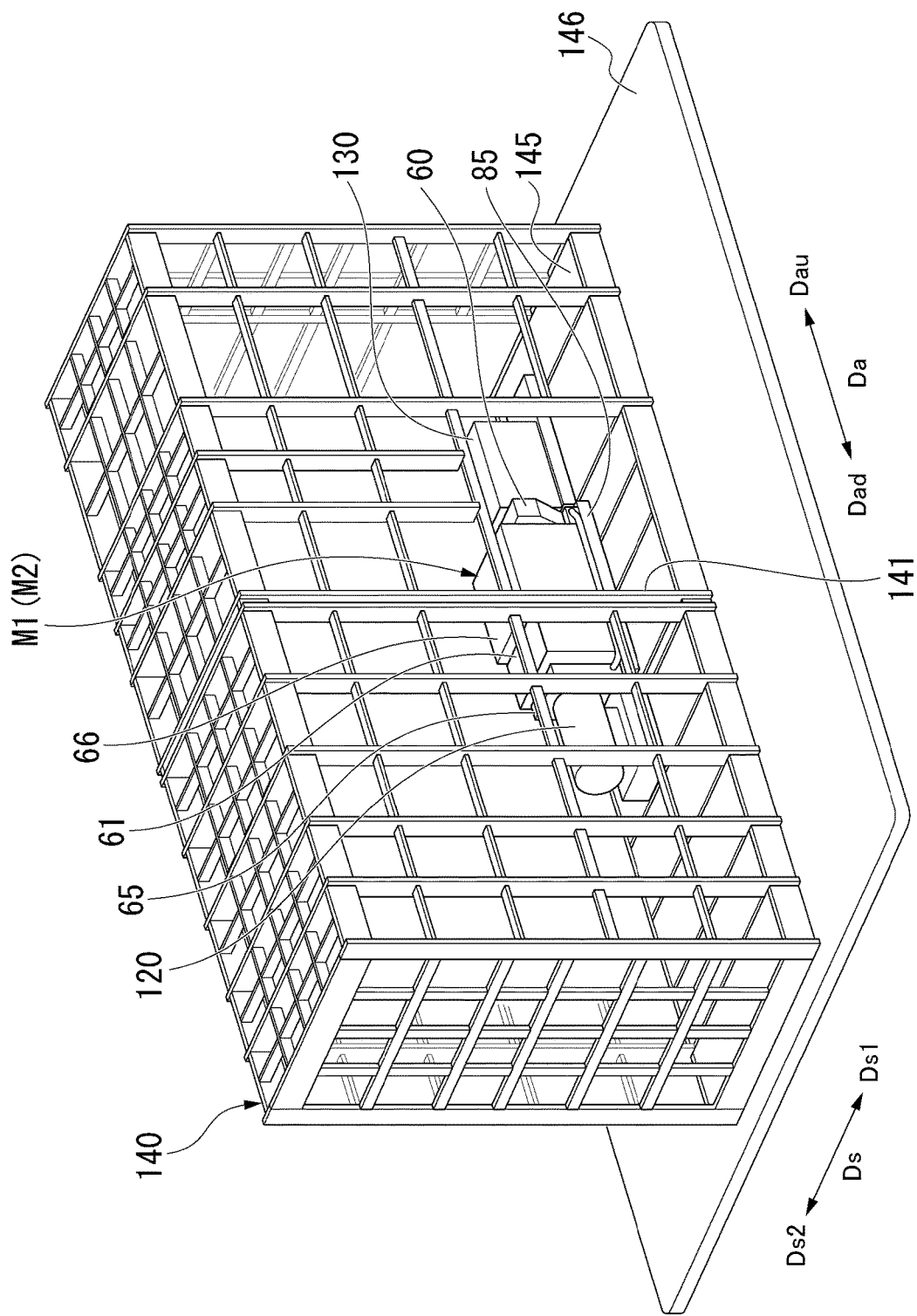
FIG. 3 is a perspective view of the gas turbine plant according to the embodiment of the present disclosure.
Figure 4:
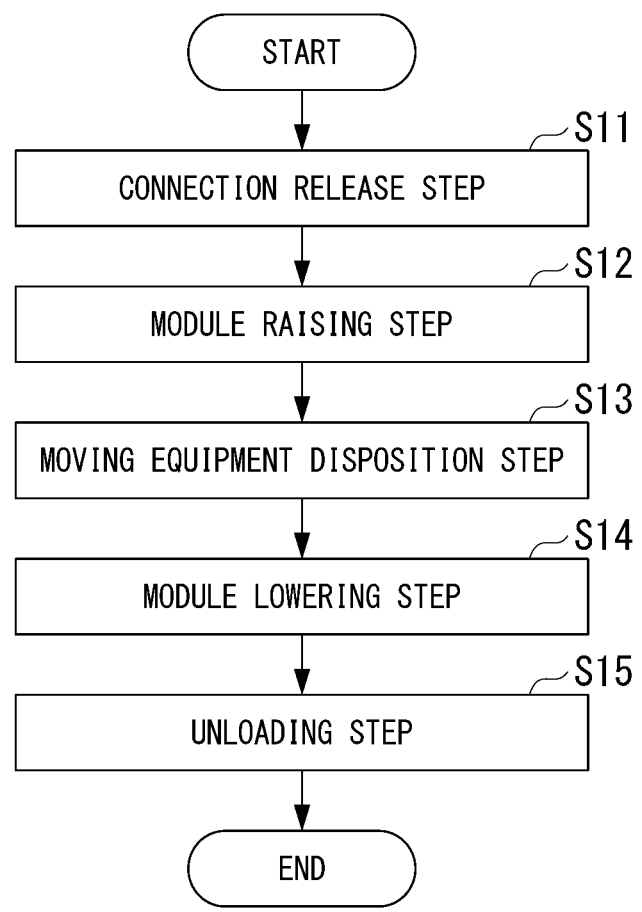
FIG. 4 is a flowchart showing a method of unloading a gas turbine module according to the embodiment of the present disclosure.
Figure 5:
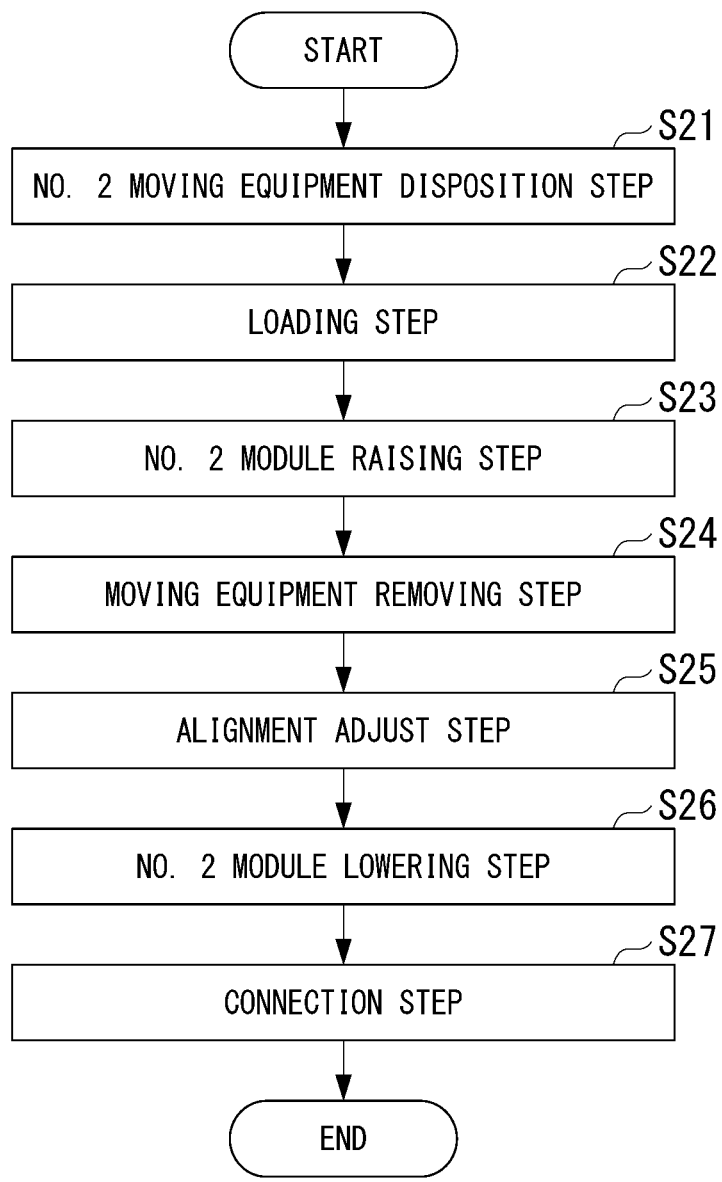
FIG. 5 is a flowchart showing a method of loading a gas turbine module according to the embodiment of the present disclosure.

The plant building 140 is built on a plant foundation 146, as shown in FIG. 3. The gas turbine foundation 145 is located inside the plant building 140 and is provided on the plant foundation 146. The plant building 140 has an opening 141. The opening 141 is provided on the no. 1 side direction side Ds1 of the no. 1 gas turbine module M1. The width of the opening 141 in the axial direction Da is larger than the width of the no. 1 gas turbine module M1 in the axial direction Da.

[Methods of Unloading and Loading Gas Turbine Module, and Method of Exchanging Gas Turbine Module for Executing These]

Methods of unloading and loading a gas turbine module, and a method of exchanging a gas turbine module for executing these according to the present embodiment will be described with reference to FIGS. 4 to 13.

The method of exchanging a gas turbine module is executed by executing the methods of unloading and loading a gas turbine module. First, the method of unloading the no. 1 gas turbine module M1 will be described with reference to a flowchart shown in FIG. 4.

In the method of unloading the no. 1 gas turbine module M1, first, a connection release step (S11) is executed. In the connection release step (S11), a connection C1 (see FIG. 1) between the common base 85 and the gas turbine foundation 145 is released. Specifically, the plurality of anchor bolts 89 that fix the common base 85 to the gas turbine foundation 145 are removed. Since the anchor bolts 89 are not welded to the common base 85 as described above, the anchor bolts 89 can be removed from the common base 85 without cutting a part of the common base 85 or the anchor bolts 89. Further, a connection with a plurality of connection objects connected to the no. 1 gas turbine module M1 is released. All of the plurality of connection objects form a part of the gas turbine plant. Examples of the connection objects include the inlet coupling 115 and the exhaust coupling 125 which are connected to the gas turbine rotor 11, the inlet duct 101, the exhaust duct 102, the fuel piping 31 which is connected to the combustor 30, the lube oil piping 132 which is connected to each of the inlet bearing 55 and the exhaust bearing 56, the various cables 151 which are connected to the fuel control valves 32a and 32b or the IGV equipment 25, and the like. Therefore, in the connection release step (S11), a connection C3 between the no. 2 flange 117 of the inlet coupling 115 and the flange 112 of the rotor 111 of the inlet rotating equipment 110 (see FIG. 1) is released and a connection C5 between the no. 2 flange 127 of the exhaust coupling 125 and the flange 122 of the rotor 121 of the exhaust rotating equipment 120 is released. Further, a connection C6 between the inlet plenum 60 and the inlet duct 101, a connection C7 between the exhaust plenum 61 and the exhaust duct 102, a connection between the combustor 30 and the fuel piping 31, a connection of each of the inlet bearing 55 and the exhaust bearing 56 with the lube oil piping 132, and a connection of each of the fuel control valves 32a and 32b or the IGV equipment 25 with each of the cables 151 are released.

In the connection release step (S11), a connection C2 between the gas turbine rotor 11 and the inlet coupling 115 (see FIG. 1) and a connection C4 between the gas turbine rotor 11 and the exhaust coupling 125 are released as necessary.

Figure 6:
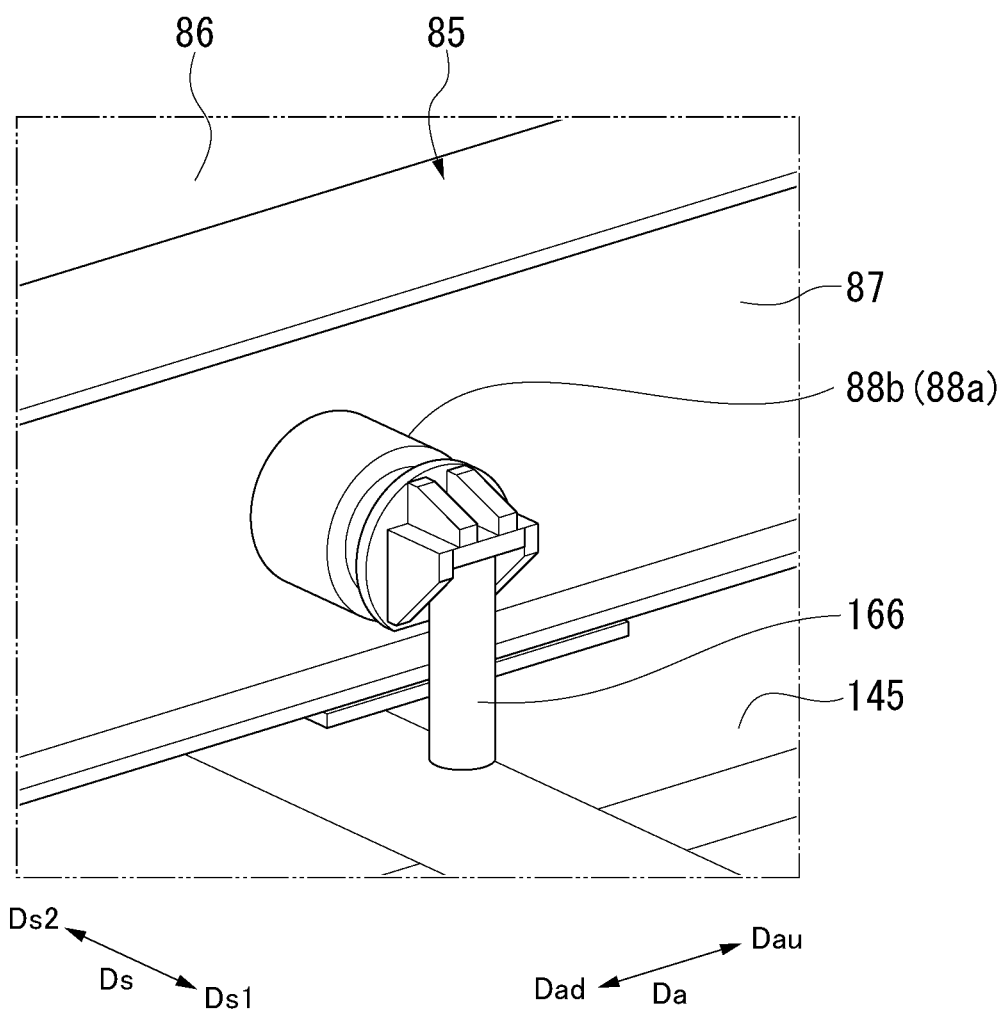
FIG. 6 is a perspective view of a common base, a trunnion, and a jack in the process of a module raising step according to the embodiment of the present disclosure.
Figure 7:
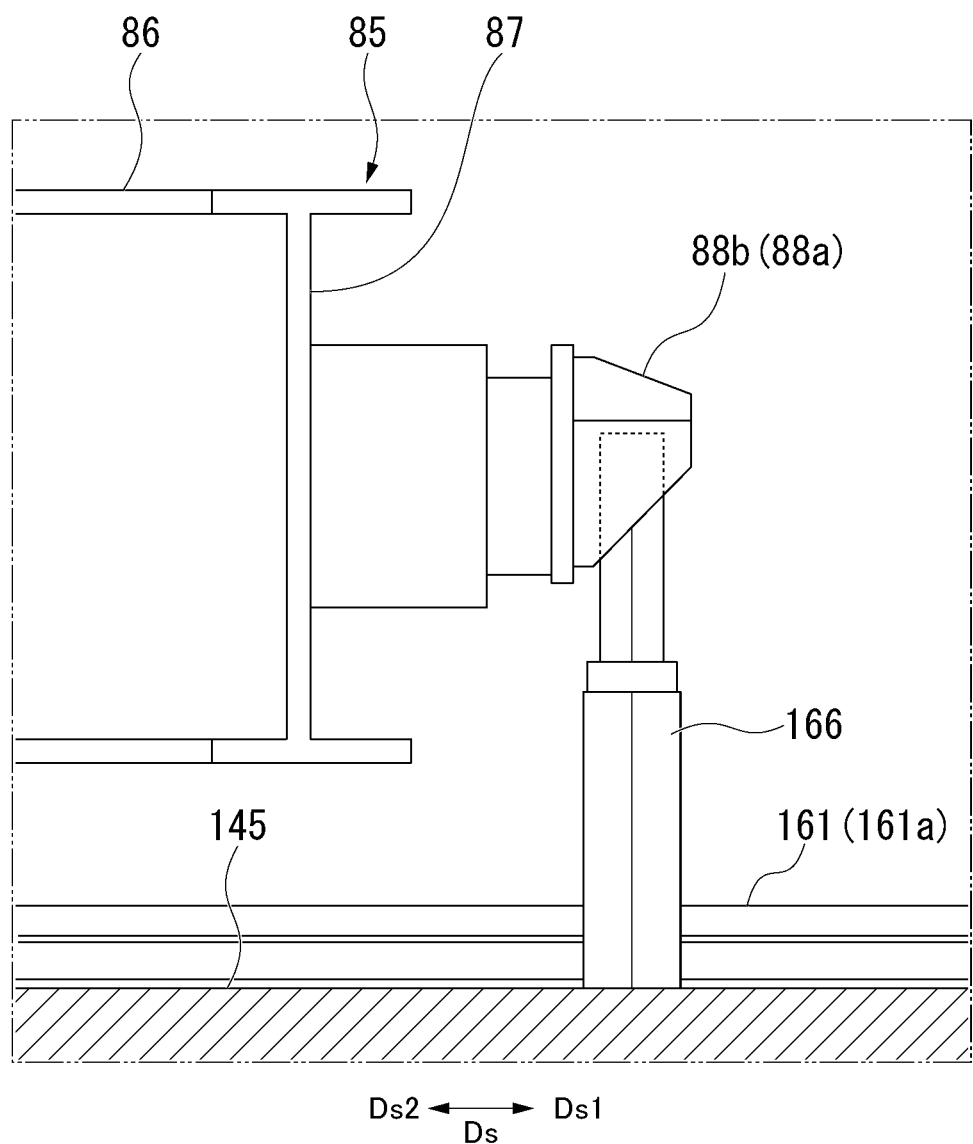
FIG. 7 is a front view of the common base, the trunnion, the jack, and moving equipment during the module raising step and in the process of a moving equipment disposition step according to the embodiment of the present disclosure.

In the method of unloading the no. 1 gas turbine module M1, next, a module raising step (S12) is executed. In the module raising step (S12), the no. 1 gas turbine module M1 is lifted from the gas turbine foundation 145. At this time, as shown in FIG. 6, a jack 166 is disposed between each of the plurality of trunnions 88a and 88b provided on the common base 85 and the gas turbine foundation 145. Then, as shown in FIG. 7, the jack 166 lifts the no. 1 gas turbine module M1.

Figure 8:
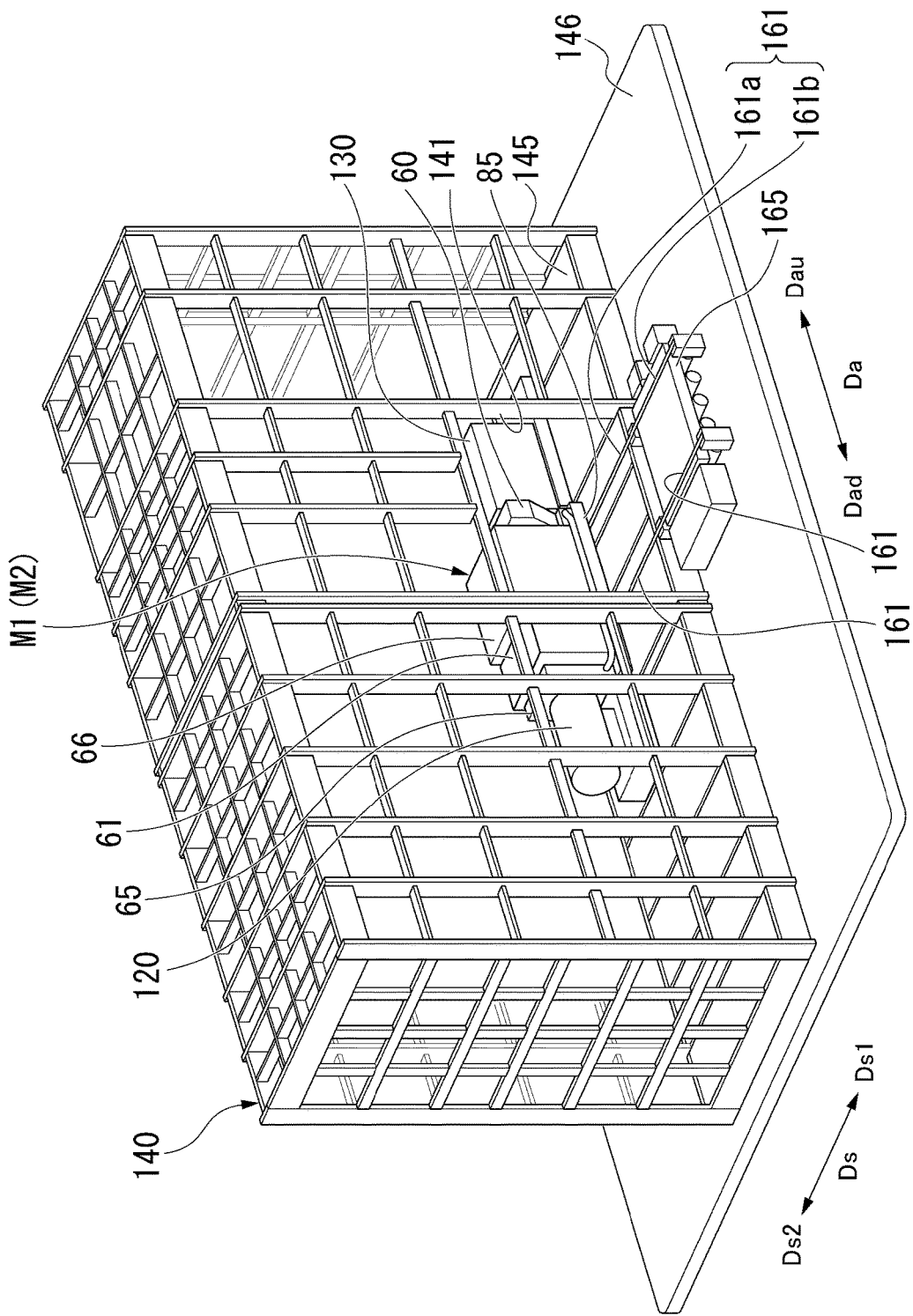
FIG. 8 is a perspective view of the gas turbine plant during the moving equipment disposition step according to the embodiment of the present disclosure.
Figure 9:
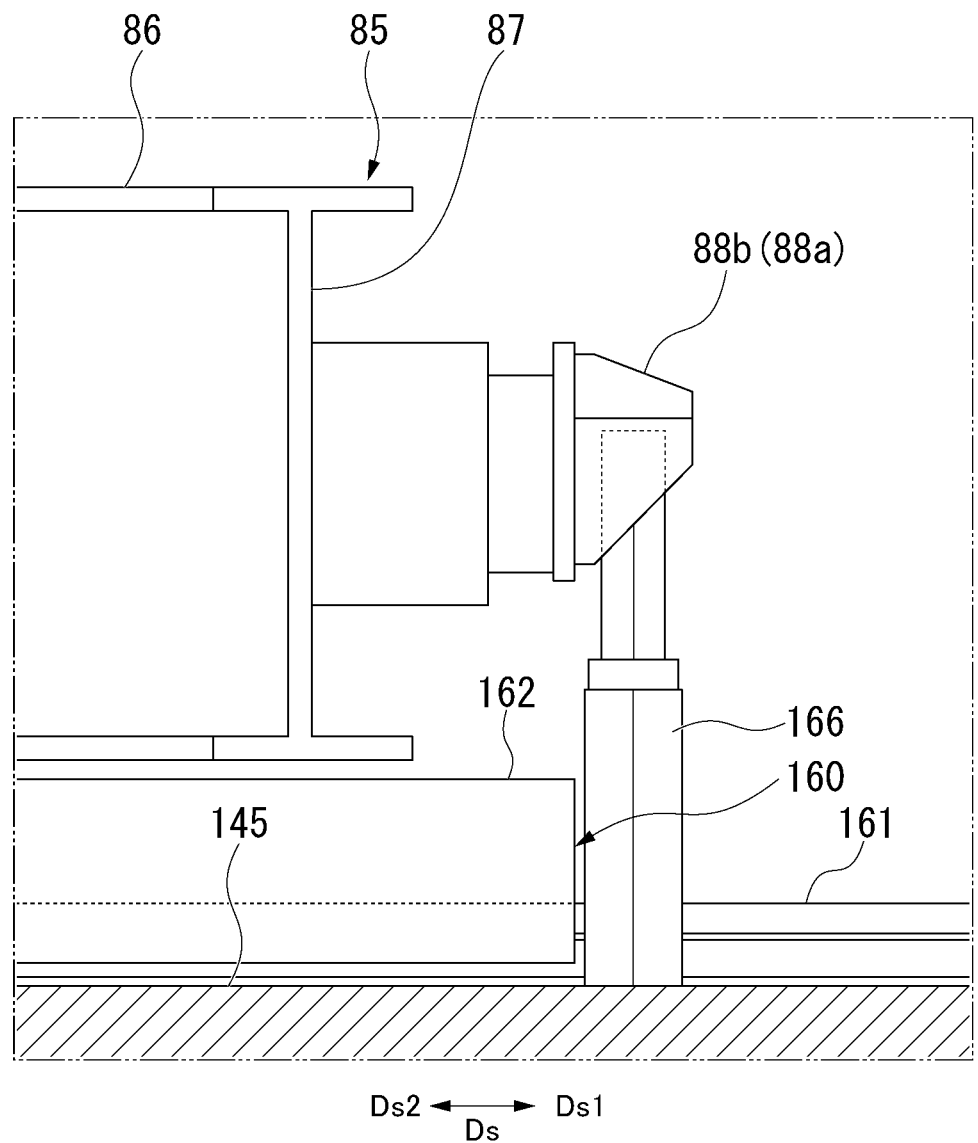
FIG. 9 is a front view of the common base, the trunnion, the jack, and the moving equipment during the module raising step and after the moving equipment disposition step according to the embodiment of the present disclosure.
Figure 10:
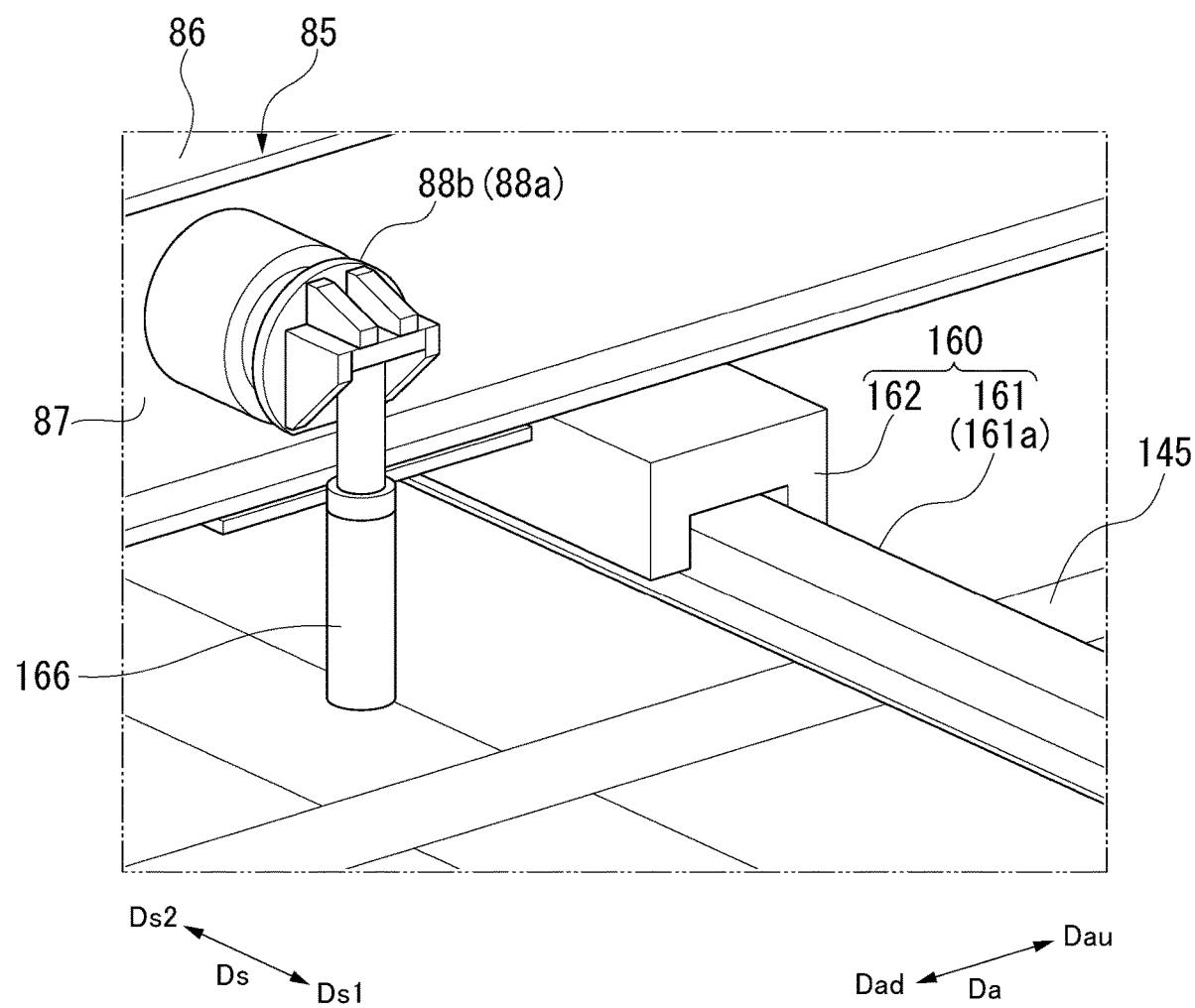
FIG. 10 is a perspective view of the common base, the trunnion, the jack, and the moving equipment during the module raising step and after the moving equipment disposition step according to the embodiment of the present disclosure.

In the method of unloading the no. 1 gas turbine module M1, next, a moving equipment disposition step (S13) is executed. In the moving equipment disposition step (S13), first, as shown in FIG. 8, auto transport equipment 165 is disposed outside the plant building 140 at a position along the opening 141 of the plant building 140. A level of an upper surface of the auto transport equipment 165 is substantially the same as a level of the gas turbine foundation 145 in the plant building 140. Next, as shown in FIGS. 9 and 10, moving equipment 160 that moves the no. 1 gas turbine module M1 is disposed in a gap between the common base 85 and the gas turbine foundation 145. The moving equipment 160 includes a pair of rails 161 and moving carts 162 that move on the rails 161. In disposing the moving equipment 160, first, the rails 161 are disposed such that the rails 161 extend from below the common base 85 to the auto transport equipment 165 which is a moving destination in the no. 1 side direction side Ds1. As shown in FIG. 8, the rail 161 includes a rail for indoor 161a in the plant building 140 and a rail on transport equipment 161b on the auto transport equipment 165. The rail for indoor 161a is basically installed permanently, and the rail on transport equipment 161b is installed temporarily. However, it may be appropriately selected whether the rail for indoor 161a is permanently installed or temporarily installed, and whether the rail on transport equipment 161b is temporarily installed or permanently installed. As described above, the level of the upper surface of the auto transport equipment 165 is substantially the same as the level of the gas turbine foundation 145 in the plant building 140. A cross-sectional shape of the rail on transport equipment 161b is substantially the same as a cross-sectional shape of the rail for indoor 161a. Therefore, an upper surface level of the rail on transport equipment 161b is substantially the same as an upper surface level of the rail for indoor 161a. As a drive source for moving the moving carts 162, an electric motor, a linear electric actuator, a hydraulic cylinder, or the like can be considered. Next, the moving carts 162 are disposed on the rail 161.

Figure 11:
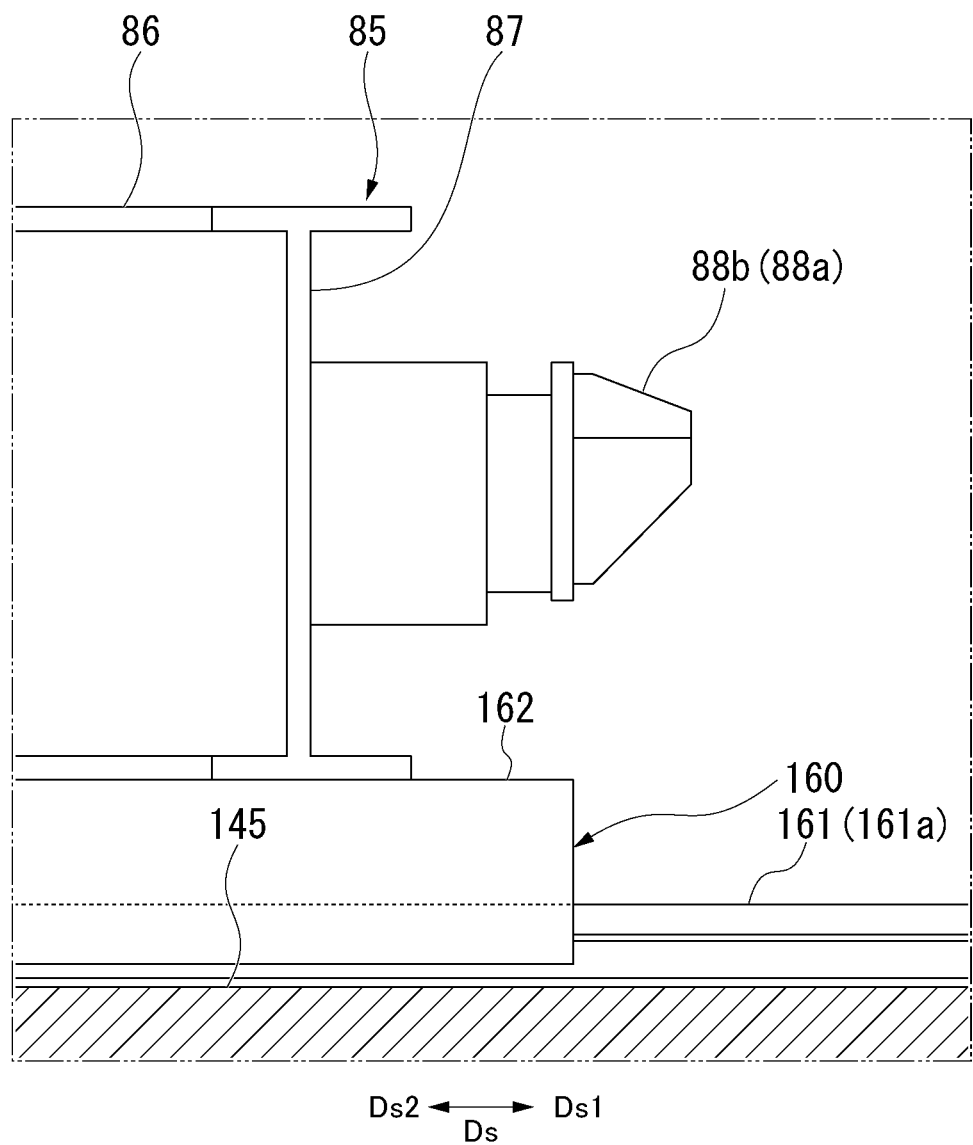
FIG. 11 is a front view of the common base, the trunnion, and the moving equipment after a module lowering step in the embodiment according to the present disclosure.

When the moving equipment disposition step (S13) ends, a module lowering step (S14) is executed. In the module lowering step (S14), the module raising step (S12) ends, and the no. 1 gas turbine module M1 is placed on the moving carts 162 of the moving equipment 160, as shown in FIG. 11. Specifically, after lowering a drive end of the jack 166, the jack 166 is removed from between each of the trunnions 88a and 88b and the gas turbine foundation 145. As a result, the no. 1 gas turbine module M1 is lowered, and the no. 1 gas turbine module M1 is placed on the moving cart 162.

Figure 12:
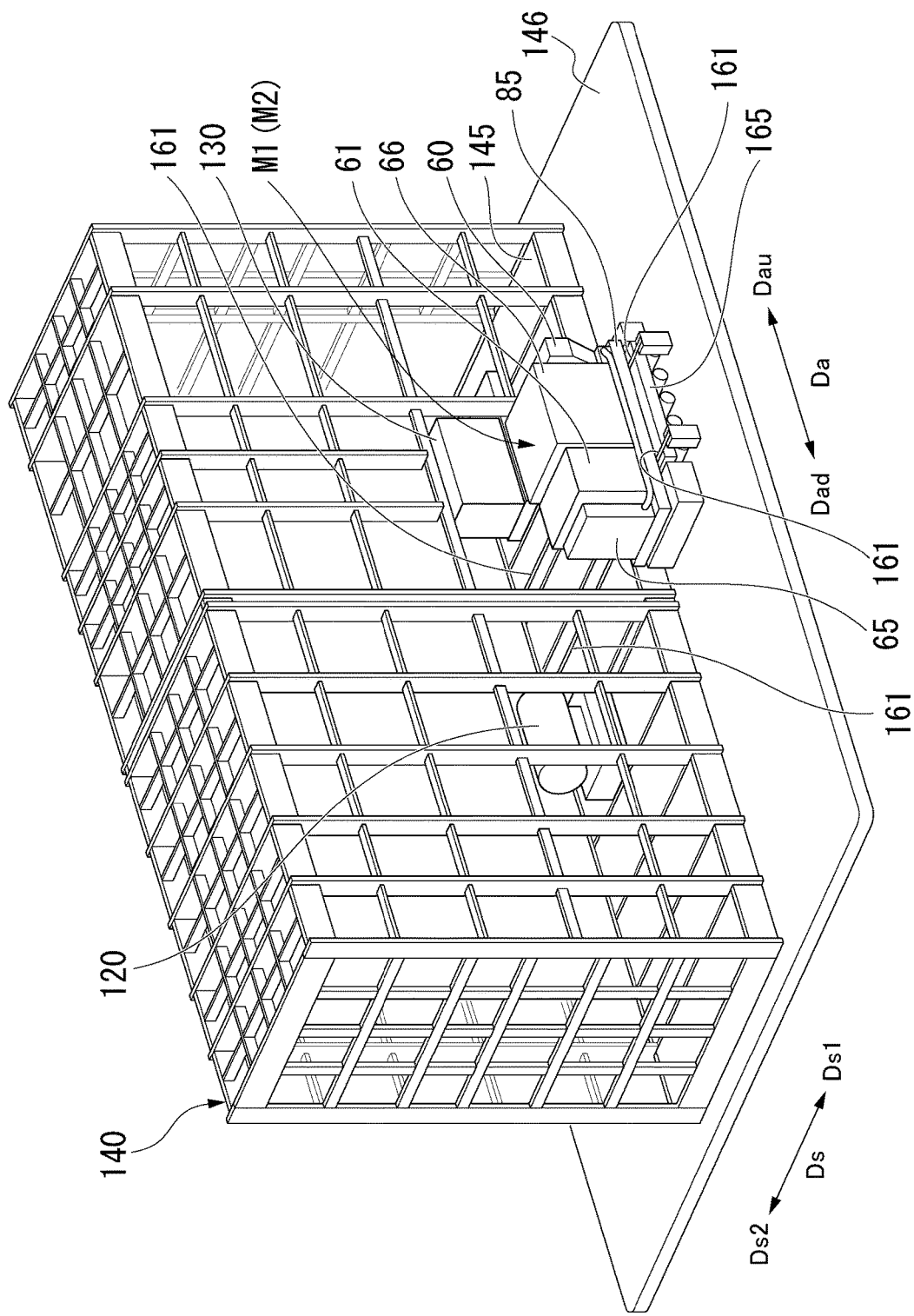
FIG. 12 is a perspective view of the gas turbine plant after the moving equipment disposition step according to the embodiment of the present disclosure.

When the module lowering step (S14) ends, an unloading step (S15) is executed. In the unloading step (S15), as shown in FIG. 12, the moving carts 162 are driven, and the no. 1 gas turbine module M1 is moved along the rail 161 to above the auto transport equipment 165.

With this, the method of unloading the no. 1 gas turbine module M1 according to the present embodiment ends.

As described above, when the unloading of the no. 1 gas turbine module M1 ends, the no. 1 gas turbine module M1 is moved to, for example, a repair factory together with the auto transport equipment 165 and the moving carts 162, and the no. 1 gas turbine module M1 is inspected and repaired in the repair factory. Further, when the unloading of the gas turbine module M1 ends, a method of loading a no. 2 gas turbine module M2 is executed in parallel with or prior to the inspection and repair of the no. 1 gas turbine module M1 in the repair factory. The method of loading the no. 2 gas turbine module M2 will be described with reference to a flowchart shown in FIG. 5.

Here, the no. 2 gas turbine module M2 is a gas turbine module that can replace the no. 1 gas turbine module M1 that is the unloaded no. 1 gas turbine module M1. Specifically, the no. 2 gas turbine module M2 is a gas turbine module that can be smoothly connected to the plurality of connection objects without modifying the plurality of connection objects were connected to the no. 1 gas turbine module M1. Therefore, the no. 2 gas turbine module M2 may be a gas turbine module of exactly the same type as the no. 1 gas turbine module M1. In addition, as long as the no. 2 gas turbine module M2 can be smoothly connected to the plurality of connection objects without modifying the plurality of connection objects, the no. 2 gas turbine module may be partially different from the no. 1 gas turbine module M1 (for example, in an internal blade shape, IGV equipment, or the like). Note that, like the no. 1 gas turbine module M1, the no. 2 gas turbine module M2 also includes the gas turbine base (a no. 2 gas turbine base) 80 and the common base (a no. 2 common base) 85 in addition to the gas turbine (a no. 2 gas turbine) 10, the inlet plenum (a no. 2 inlet plenum) 60, and the exhaust plenum (a no. 2 exhaust plenum) 61.

In the method of loading the no. 2 gas turbine module M2, first, a no. 2 moving equipment disposition step (S21) is executed. In the no. 2 moving equipment disposition step (S21), first, as shown in FIG. 12, auto transport equipment 165 on which the no. 2 gas turbine module M2 is mounted is disposed outside the plant building 140 at a position along the opening 141 of the plant building 140. Then, in a case in which the moving carts 162 are not disposed between the no. 2 gas turbine module M2 and the auto transport equipment 165, the no. 2 gas turbine module M2 is lifted and the moving carts 162 are disposed between the no. 2 gas turbine module M2 and the auto transport equipment 165.

When the no. 2 moving equipment disposition step (S21) ends, a loading step (S22) is executed. In the loading step (S22), the moving carts 162 are driven and the no. 2 gas turbine module M2 is moved along the rail 161 to a region on the gas turbine foundation 145 where the no. 1 gas turbine module M1 was installed.

Figure 13:
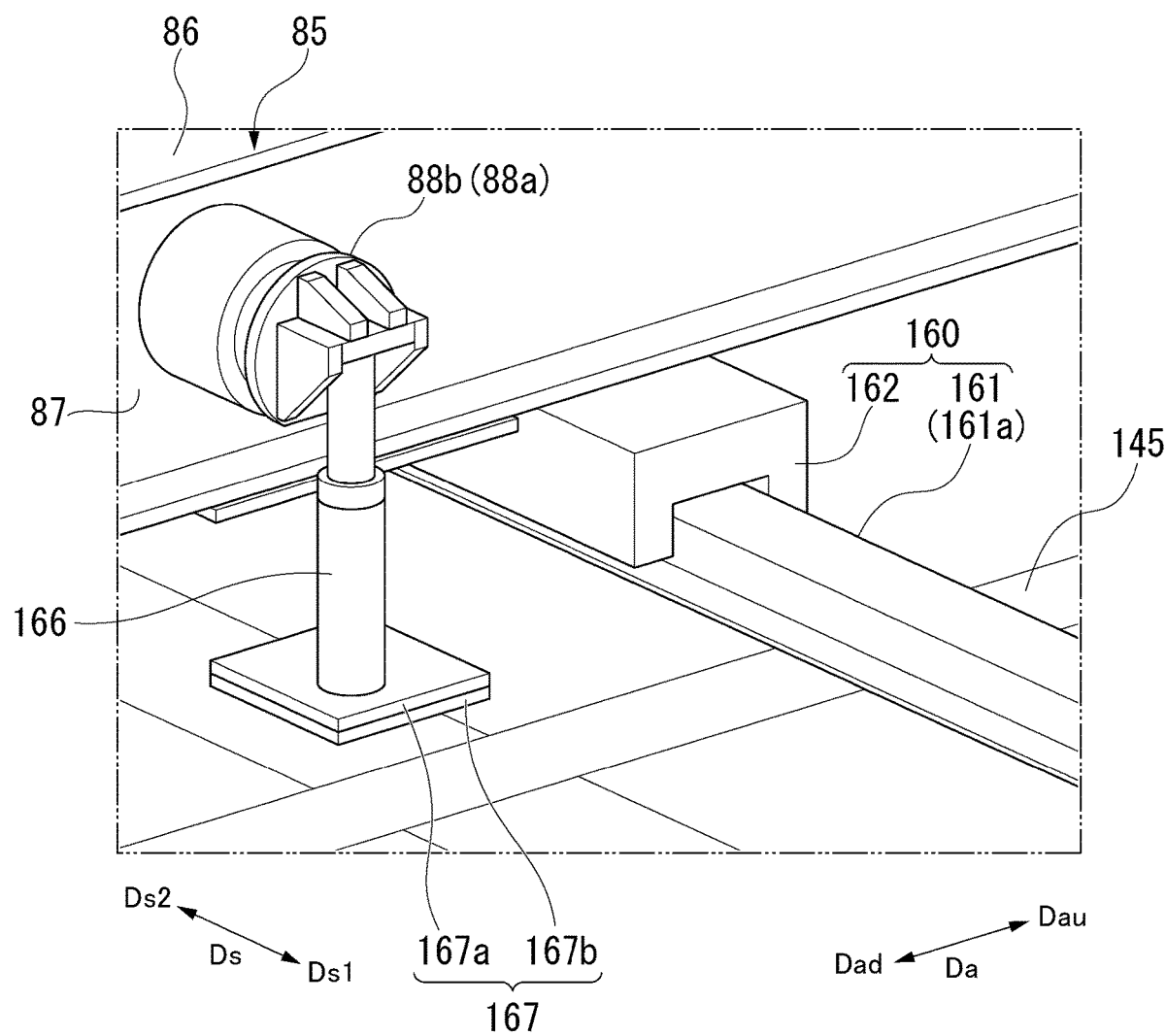
FIG. 13 is a perspective view of the common base, the trunnion, the jack, alignment adjust equipment, and the moving equipment during a no. 2 module raising step and before a moving equipment removing step according to the embodiment of the present disclosure.

When the loading step (S22) ends, a no. 2 module raising step (S23) is executed. In the no. 2 module raising step (S23), the no. 2 gas turbine module M2 is lifted from the moving carts 162. At this time, as shown in FIG. 13, alignment adjust equipment 167 and the jack 166 are disposed between each of the plurality of trunnions 88a and 88b provided on the common base 85 and the gas turbine foundation 145. Note that a jack is disposed on the alignment adjust equipment 167. Then, the jack 166 lifts the no. 2 gas turbine module M2.

In the method of loading the no. 2 gas turbine module M2, next, a moving equipment removing step (S24) is executed. In the moving equipment removing step (S24), the moving equipment 160 is removed from above the gas turbine foundation 145. That is, the moving carts 162 and the rails 161 are removed from above the gas turbine foundation 145.

When the moving equipment removing step (S24) ends, an alignment adjust step (S25) is executed. As shown in FIG. 13, the above-described alignment adjust equipment 167 includes an adjust table 167a formed of a low friction material such as a fluororesin and a support table 167b for supporting the adjust table 167a. In the alignment adjust step (S25), positions of the no. 2 gas turbine module M2 in the horizontal direction, specifically, the position in the axial direction Da and the position in the side direction Ds, are adjusted.

When the no. 2 gas turbine module M2 is moved in the horizontal direction, the adjust table 167a is moved in the horizontal direction relative to the support table 167b by an electric actuator, a hydraulic cylinder, or the like. As a result, the adjust table 167a, the jack 166 on the adjust table 167a, and the no. 2 gas turbine module M2 on the jack 166 are moved in the horizontal direction.

When the alignment adjust step (S25) ends, a no. 2 module lowering step (S26) is executed. In the no. 2 module lowering step (S26), the no. 2 module raising step (S23) ends, and the no. 2 gas turbine module M2 is placed on the gas turbine foundation 145. Specifically, after lowering a drive end of the jack 166, the jack 166 is removed from between each of the trunnions 88a and 88b and the gas turbine foundation 145. Further, the alignment adjust equipment 167 is removed from above the gas turbine foundation 145. As a result, the no. 2 gas turbine module M2 is lowered, and the no. 2 gas turbine module M2 is placed on the gas turbine foundation 145.

When the no. 2 module lowering step (S26) ends, a connection step (S27) is executed. In the connection step (S27), the common base 85 of the no. 2 gas turbine module M2 and the gas turbine foundation 145 are connected to each other. Specifically, the common base 85 of the no. 2 gas turbine module M2 is fixed to the gas turbine foundation 145 using the plurality of anchor bolts 89. Furthermore, the above-described plurality of connection objects are connected to the no. 2 gas turbine module M2. In the connection step (S27), the no. 1 flange 116 of the inlet coupling 115 and the inlet flange 13 of the gas turbine rotor 11 are connected to each other, and the no. 2 flange 117 of the inlet coupling 115 and the flange 112 of the rotor 111 of the inlet rotating equipment 110 are connected to each other. Furthermore, in the connection step (S27), the no. 1 flange 126 of the exhaust coupling 125 and the exhaust flange 14 of the gas turbine rotor 11 are connected to each other, and the no. 2 flange 127 of the exhaust coupling 125 and the flange 122 of the rotor 121 of the exhaust rotating equipment 120 are connected to each other.

With this, the method of loading the no. 2 gas turbine module M2 according to the present embodiment ends. As a result, the method for exchanging a gas turbine module according to the present embodiment ends, and the no. 1 gas turbine module M1 is exchanged with the no. 2 gas turbine module M2.

In the present embodiment, since the entire gas turbine 10 is mounted on the common base 85, the common base 85 is moved together with the gas turbine 10, and thus it is not necessary to partially isolate the gas turbine 10, which can facilitate the unloading work and the loading work and shorten the work time. Therefore, in the present embodiment, the exchange work of the gas turbine 10 can be easily performed, and the work period can be shortened.

In the present embodiment, since the no. 1 gas turbine module M1 is moved in the side direction Ds in the unloading step (S11), even if the rotors 111 and 121 of the other rotating equipment 110 and 120 are connected to the ends of the gas turbine rotor 11, the no. 1 gas turbine module M1 can be unloaded without moving the other rotating equipment 110 and 120. Particularly, in the present embodiment, the rotor 111 of the inlet rotating equipment 110 is not located inside the inlet plenum 60, and thus the no. 1 gas turbine module M1 including the inlet plenum 60 can be easily unloaded without isolating the inlet plenum 60. Furthermore, in the present embodiment, the rotor 121 of the exhaust rotating equipment 120 is not located inside the exhaust plenum 61, and thus the no. 1 gas turbine module M1 including the exhaust plenum 61 can be easily unloaded without isolating the exhaust plenum 61.

Since the gas turbine 10 is a type of rotating equipment, it is also preferable to minimize the flexure thereof in the moving process thereof. In the present embodiment, the heaviest gas turbine 10 in the no. 1 gas turbine module M1 is mounted on the gas turbine base 80, and the gas turbine base 80 is mounted on the common base 85. That is, the heaviest gas turbine 10 in the no. 1 gas turbine module M1 is supported by the two overlapping bases. Furthermore, the load of the gas turbine 10 on the common base 85 can be dispersed from the gas turbine base 80. Therefore, in the present embodiment, it is possible to suppress the flexure of the gas turbine 10 in the moving process thereof. Moreover, in the present embodiment, the exhaust plenum 61 which is lighter than the gas turbine 10 in the no. 1 gas turbine module M1 is not mounted on the gas turbine base 80 but is mounted on the common base 85. That is, in the present embodiment, the gas turbine base 80 is mounted only on a part of the upper surface 86 of the common base 85. Therefore, in the present embodiment, it is possible to suppress the flexure of the gas turbine 10 in the moving process thereof while suppressing an increase in weight of the no. 1 gas turbine module M1.

In the present embodiment, the reason why the no. 1 gas turbine module M1 has two bases of the gas turbine base 80 and the common base 85, is also due to the following reason.

The exhaust diffuser 51 of which a part on the axial downstream side Dad is disposed in the exhaust plenum 61 is formed such that a cross-sectional area of the diffuser area 52 through which the exhaust gas Gex passes becomes larger toward the axial downstream side Dad. Therefore, a distance from the axis Ar to a lower end of the exhaust plenum 61 is larger than a distance from the axis Ar to the lowermost end of the gas turbine 10.

It is assumed that the no. 1 gas turbine module M1 includes the common base 85 and does not include the gas turbine base 80. In this case, to avoid interference between the common base 85 and the exhaust plenum 61, it is necessary to increase the height of each of the inlet support 90 and the exhaust support 91 which support the gas turbine 10, and the height of the IGV support 92. However, if the height of the inlet support 90, the height of the exhaust support 91 and the height of the IGV support 92 are increased, it is disadvantageous in terms of vibration and support strength. Therefore, in the present embodiment, to avoid the interference between the common base 85 and the exhaust plenum 61, and to suppress the height of the inlet support 90, the height of the exhaust support 91, and the height of the IGV support 92, the no. 1 gas turbine module M1 includes the gas turbine base 80 in addition to the common base 85.

In the present embodiment, by engaging a drive end of the jack 166 or a wire end of a crane with each of the trunnions 88a and 88b of the common base 85, the no. 1 gas turbine module M1 can be lifted by the jack 166, the crane, or the like.

A load that is generated when the gas turbine base 80 on which the inlet plenum 60 and the gas turbine 10 are placed is lifted is applied to the trunnions 83a and 83b of the gas turbine base 80. Therefore, the trunnions 83a and 83b are provided in the gas turbine base 80 at high strength portions.

A load that is generated when the common base 85 on which the gas turbine base 80 and the exhaust plenum 61 are placed is lifted is applied to the trunnions 88a and 88b of the common base 85. Therefore, the trunnions 88a and 88b are provided in the common base 85 at high strength portions.

In the present embodiment, the trunnions 83a and 83b of the gas turbine base 80 are disposed at positions overlapping the trunnions 88a and 88b of the common base 85 in the axial direction Da. Therefore, in the present embodiment, the position of the high strength portion in the gas turbine base 80 overlaps the position of the high strength portion in the common base 85 in the axial direction Da. For this reason, in the present embodiment, a strength of a base in which the gas turbine base 80 and the common base 85 are combined is increased, and it is possible to suppress the flexure of the gas turbine 10 in the moving process thereof.

It is also possible to lift and move the no. 1 gas turbine module M1 by a crane such as an overhead crane. However, since the no. 1 gas turbine module M1 is extremely heavy, it may be difficult to lift and move the gas turbine module by the crane. Even if there is a crane capable of moving the no. 1 gas turbine module M1, the crane is very large, and the execution cost of the module raising step (S12) and the unloading step (S15) becomes extremely high. In the present embodiment, since the no. 1 gas turbine module M1 is lifted by the jack 166 and the no. 1 gas turbine module M1 is moved by the moving equipment 160 including the pair of rails 161 and the moving carts 162, the execution cost of the module raising step (S12) and the unloading step (S15) can be suppressed.

Modification Example

The gas turbine 10 in the above embodiment is a two-shaft gas turbine including the high pressure turbine 40 and the low pressure turbine 45. However, the gas turbine may be a general single-shaft gas turbine including only one turbine.

The gas turbine 10 in the above embodiment is connected to the inlet rotating equipment 110 and the exhaust rotating equipment 120. However, the gas turbine may be connected to only one of the inlet rotating equipment 110 and the exhaust rotating equipment 120. As described above, as the rotating equipment that is connected to the gas turbine, for example, there is a generator that can function as a starter.

The inlet flange 13 of the gas turbine rotor 11 is disposed on the radial direction inner side Dri of the inlet plenum 60. However, the inlet flange 13 may be disposed on the axial upstream side Dau of the inlet plenum 60. Even in this case, the no. 2 flange 117 of the inlet coupling 115 is disposed more on the axial upstream side Dau than the inlet plenum 60. Further, the exhaust flange 14 of the gas turbine rotor 11 is disposed on the radial direction inner side Dri of the exhaust plenum 61. However, the exhaust flange 14 may be disposed more on the axial downstream side Dad than the exhaust plenum 61 and the load compartment 65. Even in this case, the no. 2 flange 127 of the exhaust coupling 125 is disposed more on the axial downstream side Dad than the exhaust plenum 61 and the load compartment 65.

The rotor 111 of the inlet rotating equipment 110 is directly connected to the inlet coupling 115. However, the rotor 111 of the inlet rotating equipment 110 and the inlet coupling 115 may be connected to each other via a transmission. In this case, the rotor 111 of the inlet rotating equipment 110 may rotate about an axis different from the axis Ar of the gas turbine rotor 11. The rotor 121 of the exhaust rotating equipment 120 is directly connected to the exhaust coupling 125. However, the rotor 121 of the exhaust rotating equipment 120 and the exhaust coupling 125 may be connected to each other via a transmission. In this case, the rotor 121 of the exhaust rotating equipment 120 may rotate about an axis different from the axis Ar of the gas turbine rotor 11.

Although the preferred embodiments of the present invention and a modification example thereof have been described above, the present invention is not limited to these embodiments and the modification example thereof. It is possible to add, omit, replace, and change configurations without departing from the gist of the present invention. The present invention is not limited by the above description, but is limited only by the scope of the appended claims.

APPENDIX

The method of unloading a gas turbine module in the above embodiment is understood as follows, for example.

(1) In a method of moving a gas turbine module according to a first aspect, the following no. 1 gas turbine module M1 is moved.

The no. 1 gas turbine module M1 includes a gas turbine 10 that has a gas turbine rotor 11 capable of rotating about an axis Ar, and a turbine shell 15 which covers the gas turbine rotor 11 and in which an inlet 23 and an exhaust 53 are formed; an inlet plenum 60 that is connected to the inlet 23 of the gas turbine 10 and is configured to guide air from an inlet duct 101 into the gas turbine 10; an exhaust plenum 61 that is connected to the exhaust 53 of the gas turbine 10 and is configured to guide exhaust gas Gex from the gas turbine 10 to an exhaust duct 102; an enclosure 66 that covers the gas turbine 10; and a common base 85 on which the gas turbine 10, the inlet plenum 60, the exhaust plenum 61, and the enclosure 66 are mounted and which is connected to a gas turbine foundation 145.

A method of moving a gas turbine module according to the first aspect includes executing the steps including a connection release step (S11) of releasing a connection between the common base 85 and the gas turbine foundation 145, and releasing connections between the no. 1 gas turbine module M1 and a plurality of connection objects that are connected to the No. 1 gas turbine module M1 and constitute a part of a gas turbine plant; a module raising step (S12) of lifting the no. 1 gas turbine module M1 from the gas turbine foundation 145 after the connection release step (S11); a moving equipment disposition step (S13) of disposing moving equipment 160 that is configured to move the no. 1 gas turbine module M1 in a gap between the common base 85 and the gas turbine foundation 145 during the module raising step (S12); a module lowering step (S14) of ending the module raising step (S12) after the moving equipment disposition step (S13) and placing the no. 1 gas turbine module M1 on the moving equipment 160; and an unloading step (S15) of driving the moving equipment 160 after the module lowering step (S14) and moving the no. 1 gas turbine module M1.

In the present aspect, since the no. 1 gas turbine module M1 including the entire gas turbine 10 is unloaded, it is not necessary to partially isolate the gas turbine 10, and the unloading work is facilitated and the work time can be shortened. Moreover, in the present aspect, since all of the components except the common base 85 in the no. 1 gas turbine module M1 are mounted on the common base 85, it is possible to easily unload the gas turbine 10 by unloading the common base 85.

(2) According to a method of moving a gas turbine module of a second aspect, in the method of unloading a gas turbine module according to the first aspect, in the module raising step (S12), the no. 1 gas turbine module M1 is lifted from the gas turbine foundation 145 using a jack 166.

It is also possible to lift the no. 1 gas turbine module M1 by a crane such as an overhead crane.

However, since the no. 1 gas turbine module M1 is extremely heavy, it may be difficult to lift the gas turbine module by the crane. Even if there is a crane capable of lifting the no. 1 gas turbine module M1, the crane is very large, and the execution cost of the module raising step becomes extremely high. In the present aspect, since the no. 1 gas turbine module M1 is lifted using the jack 166, the execution cost of the module raising step can be suppressed, and the preparation for the module raising step can be simplified.

(3) According to a method of moving a gas turbine module of a third aspect, in the method of unloading a gas turbine module according to the first or second aspect, the moving equipment 160 includes a pair of rails 161 and moving carts 162 capable of moving on the rails 161, and in the moving equipment disposition step (S13), each of the pair of rails 161 is disposed to extend toward a moving destination of the no. 1 gas turbine module M1 from below the common base 85, and the moving carts 162 are disposed on the pair of rails 161.

It is also possible to move the no. 1 gas turbine module M1 by a crane such as an overhead crane. However, since the no. 1 gas turbine module M1 is extremely heavy, it may be difficult to move the gas turbine module by the crane. Even if there is a crane capable of moving the no. 1 gas turbine module M1, the crane is very large, and the execution cost of the unloading step becomes extremely high.

In the present aspect, since the no. 1 gas turbine module M1 is moved by the moving equipment 160 including the pair of rails 161 and the moving carts 162, the execution cost of the unloading step can be suppressed.

(4) According to a method of moving a gas turbine module of a fourth aspect, in the method of unloading a gas turbine module according to any one of the first to third aspects, the no. 1 gas turbine module M1 includes a gas turbine base 80 on which the gas turbine 10 and the inlet plenum 60 are mounted, and the gas turbine base 80, the enclosure 66, and the exhaust plenum 61 are mounted on the common base 85.

Since the gas turbine 10 is a type of rotating equipment, it is preferable to minimize the flexure thereof also in the moving process thereof. In the present aspect, the heaviest gas turbine 10 in the no. 1 gas turbine module M1 is mounted on the gas turbine base 80, and the gas turbine base 80 is mounted on the common base 85. That is, the heaviest gas turbine 10 in the no. 1 gas turbine module M1 is supported by the two overlapping bases. Furthermore, the load of the gas turbine 10 on the common base 85 can be dispersed from the gas turbine base 80. Therefore, in the present aspect, it is possible to suppress the flexure of the gas turbine 10 in the moving process thereof. Moreover, in the present aspect, the exhaust plenum 61 which is lighter than the gas turbine 10 in the no. 1 gas turbine module M1 is not mounted on the gas turbine base 80 but is mounted on the common base 85. That is, in the present aspect, the gas turbine base 80 is mounted only on a part of the upper surface 86 of the common base 85. Therefore, in the present aspect, it is possible to suppress the flexure of the gas turbine 10 in the moving process thereof while suppressing an increase in weight of the no. 1 gas turbine module M1.

(5) According to a method of moving a gas turbine module of a fifth aspect, in the method of unloading a gas turbine module according to any one of the first to fourth aspects, the gas turbine rotor 11 includes at least one flange of an inlet flange 13 that is formed at an end on a no. 1 axial side Dau where the inlet 23 is present with respect to the exhaust 53 in an axial direction Da in which the axis Ar extends and is capable of being connected to a rotor 111 of inlet rotating equipment 110, and an exhaust flange 14 that is formed at an end on a no. 2 axial side Dad where the exhaust 53 is present with respect to the inlet 23 in the axial direction Da and is capable of being connected to a rotor 121 of the exhaust rotating equipment 120. In the unloading step (S15), the no. 1 gas turbine module M1 is moved along an upper surface 86 of the common base 85 on which the gas turbine 10, the inlet plenum 60, the exhaust plenum 61, and the enclosure 66 are mounted and in a side direction Ds that is a direction different from the axial direction Da.

In the present aspect, since the no. 1 gas turbine module M1 is moved in the side direction Ds in the unloading step, even if the rotors 111 and 121 of the other rotating equipment 110 and 120 are connected to the ends of the gas turbine rotor 11, the no. 1 gas turbine module M1 can be unloaded without moving the other rotating equipment 110 and 120.

(6) According to a method of moving a gas turbine module of a sixth aspect, in the method of unloading a gas turbine module according to the fifth aspect, the side direction Ds is a direction perpendicular to the axial direction Da.

(7) According to a method of moving a gas turbine module of a seventh aspect, in the method of unloading a gas turbine module according to the fifth or sixth aspect, the gas turbine rotor 11 includes the inlet flange 13.

The gas turbine plant includes, as one of the plurality of connection objects, an inlet coupling 115 that has a no. 1 flange 116 capable of being connected to the inlet flange 13 and a no. 2 flange 117 capable of being connected to the rotor 111 of the inlet rotating equipment 110. In a state in which the no. 1 flange 116 of the inlet coupling 115 is connected to the inlet flange 13, the no. 2 flange 117 of the inlet coupling 115 is located more on the no. 1 axial side Dau than the inlet plenum 60. In the connection release step (S11), a connection between the no. 1 flange 116 of the inlet coupling 115 and the inlet flange 13 is released, and a connection between the no. 2 flange 117 of the inlet coupling 115 and the rotor 111 of the inlet rotating equipment 110 is released.

In the present aspect, the rotor 111 of the inlet rotating equipment 110 is not located inside the inlet plenum 60, and thus the no. 1 gas turbine module M1 including the inlet plenum 60 can be easily unloaded without isolating the inlet plenum 60.

(8) According to a method of moving a gas turbine module of an eighth aspect, in the method of unloading a gas turbine module according to any one of the fifth to seventh aspects, the gas turbine rotor 11 includes the exhaust flange 14. The gas turbine plant includes, as one of the plurality of connection objects, an exhaust coupling 125 that has a no. 1 flange 126 capable of being connected to the exhaust flange 14 and a no. 2 flange 127 capable of being connected to the rotor 121 of the exhaust rotating equipment 120. In a state in which the no. 1 flange 126 of the exhaust coupling 125 is connected to the exhaust flange 14, the no. 2 flange 127 of the exhaust coupling 125 is located more on the no. 2 axial side Dad than the exhaust plenum 61. In the connection release step (S11), a connection between the no. 1 flange 126 of the exhaust coupling 125 and the exhaust flange 14 is released, and a connection between the no. 2 flange 127 of the exhaust coupling 125 and the rotor 121 of the exhaust rotating equipment 120 is released.

In the present aspect, the rotor 121 of the exhaust rotating equipment 120 is not located inside the exhaust plenum 61, and thus the no. 1 gas turbine module M1 including the exhaust plenum 61 can be easily unloaded without isolating the exhaust plenum 61.

Further, the method of exchanging a gas turbine module in the above embodiment is understood as follows, for example.

(9) In a method of exchanging a gas turbine module according to a ninth aspect, the method of unloading a gas turbine module according to any one of the first to eighth aspects is executed and a loading method of loading a no. 2 gas turbine module M2 different from a no. 1 gas turbine module M1 which is the gas turbine module is executed.

The no. 2 gas turbine module M2 includes a no. 2 gas turbine 10 that has a no. 2 gas turbine rotor 11 capable of rotating about an axis Ar, and a no. 2 turbine shell 15 which covers the no. 2 gas turbine rotor 11 and in which a no. 2 inlet 23 and a no. 2 exhaust 53 are formed; a no. 2 inlet plenum 60 that is connected to the no. 2 inlet 23 of the no. 2 gas turbine 10 and is configured to guide air from the inlet duct 101 into the no. 2 gas turbine 10; a no. 2 exhaust plenum 61 that is connected to the no. 2 exhaust 53 of the no. 2 gas turbine 10 and is configured to guide exhaust gas Gex from the no. 2 gas turbine 10 to the exhaust duct 102; a no. 2 enclosure 66 that covers the no. 2 gas turbine 10; and a no. 2 common base 85 on which the no. 2 gas turbine 10, the no. 2 inlet plenum 60, the no. 2 exhaust plenum 61, and the no. 2 enclosure 66 are mounted and which is connected to the gas turbine foundation 145. The no. 2 gas turbine module M2 is capable of being connected to the plurality of connection objects that were connected to the no. 1 gas turbine module M1.

The loading method includes executing the steps including a no. 2 moving equipment disposition step (S21) of disposing the moving equipment 160 on the gas turbine foundation 145; a loading step (S22) of driving the moving equipment 160 after the no. 2 gas turbine module M2 is placed on the moving equipment 160 and moving the no. 2 gas turbine module M2 to a location on the gas turbine foundation 145 where the no. 1 gas turbine module M1 was present; a no. 2 module raising step (S23) of lifting the no. 2 gas turbine module M2 from the moving equipment 160 after the loading step (S22); a moving equipment removing step (S24) of removing the moving equipment 160 from above the gas turbine foundation 145 during the no. 2 module raising step (S23); a no. 2 module lowering step (S26) of ending the no. 2 module raising step (S23) after the moving equipment removing step (S24) and placing the no. 2 gas turbine module M2 on the gas turbine foundation 145; and a connection step (S27) of connecting the no. 2 common base 85 and the gas turbine foundation 145 to each other and connecting the no. 2 gas turbine module M2 and the plurality of connection objects to each other.

In the present aspect, the unloading method described above is executed and, in the loading method as well, the no. 2 gas turbine module M2 including the entire gas turbine 10 is loaded, and thus the exchanging work of the gas turbine 10 is facilitated and the work period can be shortened.

Further, the gas turbine module in the above embodiment is understood as follows, for example.

(10) A gas turbine module according to a tenth aspect includes a gas turbine 10 that has a gas turbine rotor 11 capable of rotating about an axis Ar, and a turbine shell 15 which covers the gas turbine rotor 11 and in which an inlet 23 and an exhaust 53 are formed; an inlet plenum 60 that is connected to the inlet 23 of the gas turbine 10 and is configured to guide air from an inlet duct 101 into the gas turbine 10; an exhaust plenum 61 that is connected to the exhaust 53 of the gas turbine 10 and is configured to guide exhaust gas Gex from the gas turbine 10 to an exhaust duct 102; an enclosure 66 that covers the gas turbine 10; a gas turbine base 80 on which the gas turbine 10 and the inlet plenum 60 are mounted; and a common base 85 on which the gas turbine base 80, the enclosure 66, and the exhaust plenum 61 are mounted.

In the present aspect, since the entire gas turbine 10 is mounted on the common base 85, the common base 85 is moved together with the gas turbine 10, and thus, it is not necessary to partially isolate the gas turbine 10, the moving work is facilitated, and the work time can be shortened.

Since the gas turbine 10 is a type of rotating equipment, it is preferable to minimize the flexure thereof also in the moving process thereof. In the present aspect, the heaviest gas turbine 10 in the no. 1 gas turbine module M1 is mounted on the gas turbine base 80, and the gas turbine base 80 is mounted on the common base 85. That is, the heaviest gas turbine 10 in the no. 1 gas turbine module M1 is supported by the two overlapping bases. Furthermore, the load of the gas turbine 10 on the common base 85 can be dispersed from the gas turbine base 80. Therefore, in the present aspect, it is possible to suppress the flexure of the gas turbine 10 in the moving process thereof. Moreover, in the present aspect, the exhaust plenum 61 which is lighter than the gas turbine 10 in the no. 1 gas turbine module M1 is not mounted on the gas turbine base 80 but is mounted on the common base 85. That is, in the present aspect, the gas turbine base 80 is mounted only on a part of the upper surface 86 of the common base 85. Therefore, in the present aspect, it is possible to suppress the flexure of the gas turbine 10 in the moving process thereof while suppressing an increase in weight of the no. 1 gas turbine module M1.

(11) According to a gas turbine module of an eleventh aspect, the gas turbine module according to the tenth aspect further includes a plurality of trunnions 88a and 88b that are provided on the common base 85 and is configured to receive a load that is generated when the common base 85 is lifted.

In the present aspect, by engaging a drive end of the jack 166 or a wire end of a crane with each of the trunnions 88a and 88b, the no. 1 gas turbine module M1 can be lifted by the jack 166, the crane, or the like.

(12) According to a gas turbine module of a twelfth aspect, in the gas turbine module according to the eleventh aspect, the common base 85 includes an upper surface 86 on which the gas turbine base 80, the enclosure 66, and the exhaust plenum 61 are mounted, and a pair of side surfaces 87 that extend in an axial direction Da in which the axis Ar extends and face each other in a side direction Ds perpendicular to the axial direction Da and along the upper surface 86. The trunnions 88a and 88b are provided on each of the pair of side surfaces 87. In the pair of side surfaces 87, the trunnions 88a and 88b provided on one side surface 87 and the trunnions 88a and 88b provided on the other side surface 87 have the same positions in the axial direction Da.

(13) According to a gas turbine module of a thirteenth aspect, in the gas turbine module according to the twelfth aspect, the gas turbine base 80 includes an upper surface 81 on which the gas turbine 10 and the inlet plenum 60 are mounted, and a pair of side surfaces 82 that extend in an axial direction Da in which the axis Ar extends and face each other in a side direction Ds perpendicular to the axial direction Da and along the upper surface 81. Each of the pair of side surfaces 82 of the gas turbine base 80 is provided with trunnions 83a and 83b that is configured to receive a load that is generated when the gas turbine base 80 is lifted. In the pair of side surfaces 82 of the gas turbine base 80, the trunnions 83a and 83b provided on one side surface 82 and the trunnions 83a and 83b provided on the other side surface 82 have the same positions in the axial direction Da. The trunnions 83a and 83b provided on the gas turbine base 80 are disposed at positions overlapping the trunnions 88a and 88b provided on the common base 85 in the axial direction Da.

In the present aspect, by engaging a drive end of the jack 166 or a wire end of a crane with each of the trunnions 83a and 83b of the gas turbine base 80, the gas turbine base 80 and the gas turbine 10 mounted thereon can be lifted by the jack 166, the crane, or the like.

A load that is generated when the gas turbine base 80 is lifted is applied to the trunnions 83a and 83b of the gas turbine base 80. Therefore, the trunnions 83a and 83b are provided in the gas turbine base 80 at high strength portions. A load that is generated when the common base 85 is lifted is applied to the trunnions 88a and 88b of the common base 85. Therefore, the trunnions 88a and 88b are provided in the common base 85 at high strength portions.

In the present aspect, the trunnions 83a and 83b of the gas turbine base 80 are disposed at positions overlapping the trunnions 88a and 88b of the common base 85 in the axial direction Da. Therefore, in the present aspect, the position of the high strength portion in the gas turbine base 80 overlaps the position of the high strength portion in the common base 85 in the axial direction Da. For this reason, in the present aspect, a strength of a base in which the gas turbine base 80 and the common base 85 are combined is increased, and it is possible to suppress the flexure of the gas turbine 10 in the moving process thereof.

Further, the gas turbine plant in the above embodiment is understood as follows, for example.

(14) A gas turbine plant of a fourteenth aspect includes the gas turbine module according to any one of the tenth to thirteenth aspects; inlet rotating equipment 110 that has a rotor 111 and is disposed more on a no. 1 axial side Dau where the inlet 23 is present with respect to the exhaust 53 in an axial direction Da in which the axis Ar extends than the gas turbine module; and an inlet coupling 115 that is configured to connect the rotor 111 of the inlet rotating equipment 110 and an end of the gas turbine rotor 11 on the no. 1 axial side Dau to each other.

An inlet flange 13 is formed at an end of the gas turbine rotor 11 on the no. 1 axial side Dau. The inlet coupling 115 has a no. 1 flange 116 capable of being connected to the inlet flange 13 and a no. 2 flange 117 capable of being connected to the rotor 111 of the inlet rotating equipment 110. In a state in which the no. 1 flange 116 of the inlet coupling 115 is connected to the inlet flange 13, the no. 2 flange 117 of the inlet coupling 115 is located more on the no. 1 axial side Dau than the inlet plenum 60.

(15) A gas turbine plant of the fifteenth aspect includes the gas turbine module according to any one of the tenth to thirteenth aspects; an exhaust rotating equipment 120 that has a rotor 121 and is disposed more on a no. 2 axial side Dad where the exhaust 53 is present with respect to the inlet 23 in an axial direction Da in which the axis Ar extends than the gas turbine module; and an exhaust coupling 125 that is configured to connect the rotor 121 of the exhaust rotating equipment 120 and an end of the gas turbine rotor 11 on the no. 2 axial side Dad to each other.

An exhaust flange 14 is formed at an end of the gas turbine rotor 11 on the no. 2 axial side Dad. The exhaust coupling 125 has a no. 1 flange 126 capable of being connected to the exhaust flange 14 and a no. 2 flange 127 capable of being connected to the rotor 121 of the exhaust rotating equipment 120. In a state in which the no. 1 flange 126 of the exhaust coupling 125 is connected to the exhaust flange 14, the no. 2 flange of the exhaust coupling 125 is located more on the no. 2 axial side Dad than the exhaust plenum 61.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

10 Gas turbine
11 Gas turbine rotor
11a No. 1 rotor
11b No. 2 rotor
13 Inlet flange
14 Exhaust flange
15 Turbine shell
16 Discharge casing
20 Compressor
21 Compressor rotor
22 Compressor casing
23 Inlet
24 Discharge
25 Inlet guide vane equipment (IGV equipment)
26 Vane
27 Driver
30 Combustor
31 Fuel piping
31a Main fuel piping
31b Fuel piping for combustor
32a Main fuel control valve
32b Fuel control valve for combustor
40 High pressure turbine
41 High pressure turbine rotor
42 High pressure turbine casing 45 Low pressure turbine
46 Low pressure turbine rotor
47 Low pressure turbine casing
50 Exhaust casing
51 Exhaust diffuser
51o Outer diffuser
51i Inner diffuser
52 Diffuser area
53 Exhaust
55 Inlet bearing
56 Exhaust bearing
60 Inlet plenum
61 Exhaust plenum
62 Exhaust gas guide
63 Exhaust plenum casing
64 Exhaust bearing area
65 Load compartment
66 Enclosure
67 Ventilation system
80 Gas turbine base
81 Upper surface
82 Side surface
83a No. 1 trunnion
83b No. 2 trunnion
84 Connection part
85 Common base
86 Upper surface
87 Side surface
88a No. 1 trunnion
88b No. 2 trunnion
89 Anchor bolt
90 Inlet support
91 Exhaust support
92 IGV support
93 Exhaust plenum support
94 Load compartment support
101 Inlet duct
102 Exhaust duct
110 Inlet rotating equipment
111 Rotor
112 Flange
113 Casing
115 Inlet coupling
116 No. 1 flange
117 No. 2 flange
120 Exhaust rotating equipment
121 Rotor
122 Flange
123 Casing
125 Exhaust coupling
126 No. 1 flange
127 No. 2 flange
130 ACC enclosure
131 Lube oil supply equipment
132 Lube oil piping
140 Plant building
141 Opening
145 Gas turbine foundation
146 Plant foundation
150 Control equipment
151 Cable
160 Moving equipment
161 Rail
161a Rail for indoor
161b Rail on transport equipment
162 Moving cart
165 Auto transport equipment
166 Jack
167 Alignment adjust equipment
167a Adjust table
167b Support table
M1 No. 1 gas turbine module
M2 No. 2 gas turbine module
A Air
F Fuel
Gc Combustion gas
Gex Exhaust gas
Ar Axis
Da Axial direction
Dau Axial upstream side (no. 1 axial side)
Dad Axial downstream side (no. 2 axial side)
Dc Circumferential direction
Dr Radial direction
Dri Radial direction inner side
Dro Radial direction outer side
Ds Side direction
Ds1 No. 1 side direction side
Ds2 No. 2 side direction side

What is claimed is:

1. A method of unloading a gas turbine module in a gas turbine plant, the gas turbine module including:
a gas turbine that has a gas turbine rotor capable of rotating about an axis, and a turbine shell which covers the gas turbine rotor and in which an inlet and an exhaust are formed;
an inlet plenum that is connected to the inlet of the gas turbine and is configured to guide air from an inlet duct into the gas turbine;
an exhaust plenum that is connected to the exhaust of the gas turbine and is configured to guide exhaust gas from the gas turbine to an exhaust duct;
an enclosure that covers the gas turbine; and
a common base on which the gas turbine, the inlet plenum, the exhaust plenum, and the enclosure are mounted and which is connected to a gas turbine foundation, the method comprising:
releasing connections of the gas turbine module, including releasing a connection between the common base and the gas turbine foundation, and releasing connections between the gas turbine module and a plurality of connection objects that are connected to the gas turbine module and constitute a part of the gas turbine plant;
lifting the gas turbine module from the gas turbine foundation after the releasing of the connections of the gas turbine module;
disposing moving equipment that is configured to move the gas turbine module in a gap between the common base and the gas turbine foundation during the lifting of the gas turbine module;
after the lifting of the gas turbine module and the disposing of the moving equipment, lowering the gas turbine module and placing the gas turbine module on the moving equipment; and
unloading the gas turbine module by operating the moving equipment after the lowering of the gas turbine module so as to move the gas turbine module,
wherein the gas turbine module includes a gas turbine base on which the gas turbine and the inlet plenum are mounted, and
wherein the gas turbine base, the enclosure, and the exhaust plenum are directly mounted on the common base.

2. The method of unloading a gas turbine module according to claim 1, wherein, in the lifting of the gas turbine module, the gas turbine module is lifted from the gas turbine foundation using a jack.

3. The method of unloading a gas turbine module according to claim 1, wherein the moving equipment includes a pair of rails and moving carts capable of moving on the rails, and
wherein, in the disposing of the moving equipment, each of the pair of rails is disposed to extend toward a moving destination of the gas turbine module from below the common base, and the moving carts are disposed on the pair of rails.

4. The method of unloading a gas turbine module according to claim 1,
wherein the gas turbine rotor includes at least one flange of an inlet flange that is formed at an end on a first axial side where the inlet is present with respect to the exhaust in an axial direction in which the axis extends and is capable of being connected to a rotor of inlet rotating equipment of the gas turbine plant, and an exhaust flange that is formed at an end on a second axial side where the exhaust is present with respect to the inlet in the axial direction and is capable of being connected to a rotor of exhaust rotating equipment of the gas turbine plant, and
wherein, in the unloading of the gas turbine module, the gas turbine module is moved along an upper surface of the common base on which the gas turbine, the inlet plenum, the exhaust plenum, and the enclosure are mounted and in a side direction that is a direction different from the axial direction.

5. The method of unloading a gas turbine module according to claim 4, wherein the side direction is a direction perpendicular to the axial direction.

6. The method of unloading a gas turbine module according to claim 4,
wherein the gas turbine rotor includes the inlet flange,
wherein the gas turbine plant includes, as one of the plurality of connection objects, an inlet coupling that has a first flange capable of being connected to the inlet flange and a second flange capable of being connected to the rotor of the inlet rotating equipment,
wherein, in a state in which the first flange of the inlet coupling is connected to the inlet flange, the second flange of the inlet coupling is located more toward the first axial side than the inlet plenum, and
wherein, in the releasing of the connections of the gas turbine module, a connection between the first flange of the inlet coupling and the inlet flange is released, and a connection between the second flange of the inlet coupling and the rotor of the inlet rotating equipment is released.

7. The method of unloading a gas turbine module according to claim 4,
wherein the gas turbine rotor includes the exhaust flange,
wherein the gas turbine plant includes, as one of the plurality of connection objects, an exhaust coupling that has a first flange capable of being connected to the exhaust flange and a second flange capable of being connected to the rotor of the exhaust rotating equipment,
wherein, in a state in which the first flange of the exhaust coupling is connected to the exhaust flange, the second flange of the exhaust coupling is located more toward the second axial side than the exhaust plenum, and
wherein, in the releasing of the connections of the gas turbine module, a connection between the first flange of the exhaust coupling and the exhaust flange is released, and a connection between the second flange of the exhaust coupling and the rotor of the exhaust rotating equipment is released.

8. A method of exchanging a gas turbine module in a gas turbine plant, comprising:
unloading a gas turbine module from the gas turbine plant according to the method of claim 1, wherein the gas turbine module is a first gas turbine module; and
loading a second gas turbine module in the gas turbine plant, wherein the second gas turbine module is different from the first gas turbine module,
wherein the second gas turbine module includes:
a gas turbine that has a gas turbine rotor capable of rotating about an axis, and a turbine shell which covers the gas turbine rotor and in which an inlet and an exhaust are formed;
an inlet plenum that is connected to the inlet of the gas turbine and is configured to guide air from the inlet duct into the gas turbine;
an exhaust plenum that is connected to the exhaust of the gas turbine and is configured to guide exhaust gas from the gas turbine to the exhaust duct;
an enclosure that covers the gas turbine; and
a common base on which the gas turbine, the inlet plenum, the exhaust plenum, and the enclosure are mounted, and which is connected to the gas turbine foundation,
wherein the second gas turbine module is capable of being connected to the plurality of connection objects that were connected to the first gas turbine module, and
wherein the loading of the second gas turbine module includes:
disposing the moving equipment on the gas turbine foundation;
placing the second gas turbine module on the moving equipment, and thereafter operating the moving equipment so as to move the second gas turbine module to a location on the gas turbine foundation;
lifting the second gas turbine module from the moving equipment after the operating of the moving equipment;
removing the moving equipment from above the gas turbine foundation during the lifting of the second gas turbine module;
after the lifting of the second gas turbine module and the removing of the moving equipment, lowering the second gas turbine module and placing the second gas turbine module on the gas turbine foundation; and
connecting the common base of the second gas turbine module and the gas turbine foundation to each other, and connecting the second gas turbine module and the plurality of connection objects to each other.

9. A gas turbine module comprising:
a gas turbine that has a gas turbine rotor capable of rotating about an axis, and a turbine shell which covers the gas turbine rotor and in which an inlet and an exhaust are formed;
an inlet plenum that is connected to the inlet of the gas turbine and is configured to guide air from an inlet duct into the gas turbine;
an exhaust plenum that is connected to the exhaust of the gas turbine and is configured to guide exhaust gas from the gas turbine to an exhaust duct;
an enclosure that covers the gas turbine;

a gas turbine base on which the gas turbine and the inlet plenum are mounted; and a common base on which the gas turbine base, the enclosure, and the exhaust plenum are directly mounted, wherein the common base is connected to a gas turbine foundation, and wherein the gas turbine module is configured to be able to be lifted from the gas turbine foundation after a connection between the common base and gas turbine foundation is released.

10. The gas turbine module according to claim 9, further comprising a plurality of trunnions that are provided on the common base and is configured to receive a load that is generated when the common base is lifted.

11. The gas turbine module according to claim 10, wherein the common base includes an upper surface on which the gas turbine base, the enclosure, and the exhaust plenum are mounted, and a pair of side surfaces that extend in an axial direction in which the axis extends and face each other in a side direction perpendicular to the axial direction and along the upper surface, wherein the trunnions are provided on each of the pair of side surfaces, and wherein, in the pair of side surfaces, the trunnions provided on one side surface and the trunnions provided on the other side surface have the same positions in the axial direction.

12. The gas turbine module according to claim 11, wherein the gas turbine base includes an upper surface on which the gas turbine and the inlet plenum are mounted, and a pair of side surfaces that extend in an axial direction in which the axis extends and face each other in a side direction perpendicular to the axial direction and along the upper surface, wherein each of the pair of side surfaces of the gas turbine base is provided with trunnions that are configured to receive a load that is generated when the gas turbine base is lifted, wherein, in the pair of side surfaces of the gas turbine base, the trunnions provided on one side surface and the trunnions provided on the other side surface have the same positions in the axial direction, and wherein the trunnions provided on the gas turbine base are disposed at positions overlapping the trunnions provided on the common base in the axial direction.

13. A gas turbine plant comprising:

the gas turbine module according to claim 9;

inlet rotating equipment that has a rotor and is disposed more toward a first axial side where the inlet is present with respect to the exhaust in an axial direction in which the axis extends than the gas turbine module; and an inlet coupling that is configured to connect the rotor of the inlet rotating equipment and an end of the gas turbine rotor on the first axial side to each other, wherein an inlet flange is formed at an end of the gas turbine rotor on the first axial side, wherein the inlet coupling has a first flange capable of being connected to the inlet flange and a second flange capable of being connected to the rotor of the inlet rotating equipment, and wherein, in a state in which the first flange of the inlet coupling is connected to the inlet flange, the second flange of the inlet coupling is located more toward the first axial side than the inlet plenum.

14. A gas turbine plant comprising:

the gas turbine module according to claim 9;

exhaust rotating equipment that has a rotor and, with respect to a first axial side where the inlet is present and a second axial side where the exhaust is present in an axial direction in which the axis extends, the exhaust rotating equipment is disposed more toward the second axial side than the gas turbine module; and an exhaust coupling that is configured to connect the rotor of the exhaust rotating equipment and an end of the gas turbine rotor on the second axial side to each other, wherein an exhaust flange is formed at an end of the gas turbine rotor on the second axial side, wherein the exhaust coupling has a first flange capable of being connected to the exhaust flange and a second flange capable of being connected to the rotor of the exhaust rotating equipment, and wherein, in a state in which the first flange of the exhaust coupling is connected to the exhaust flange, the second flange of the exhaust coupling is located more toward the second axial side than the exhaust plenum.

* * * * *